US010855932B2

(12) United States Patent
Wen et al.

(10) Patent No.: US 10,855,932 B2
(45) Date of Patent: Dec. 1, 2020

(54) PROCESSING HOLOGRAPHIC VIDEOS

(71) Applicant: Beijing Dajia Internet Information Technology Co., Ltd., Beijing (CN)

(72) Inventors: Ziyu Wen, Beijing (CN); Jisheng Li, Beijing (CN); Yikai Zhao, Beijing (CN); Yao Lu, Beijing (CN); Yi Xu, Beijing (CN); Zhoutian Feng, Beijing (CN); Lei Wang, Beijing (CN); Kunyao Chen, Beijing (CN); Peiyao Zhao, Beijing (CN); Xiubao Jiang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/376,928

(22) Filed: Apr. 5, 2019

(65) Prior Publication Data

US 2019/0253638 A1  Aug. 15, 2019

Related U.S. Application Data

(63) Continuation of application No. PCT/US2018/012272, filed on Jan. 3, 2018.
(Continued)

(51) Int. Cl.
*H04N 5/247* (2006.01)
*H04N 5/225* (2006.01)
(Continued)

(52) U.S. Cl.
CPC .......... *H04N 5/247* (2013.01); *G01B 11/245* (2013.01); *G06T 7/55* (2017.01); *H04N 5/2256* (2013.01);
(Continued)

(58) Field of Classification Search
CPC . G06T 2207/30196; G06T 2207/20224; G06T 2207/10048; G06T 2207/10024;
(Continued)

(56) References Cited

U.S. PATENT DOCUMENTS

| 2014/0307952 | A1* | 10/2014 | Sweeney | G06T 7/11 |
| | | | | 382/154 |
| 2016/0163054 | A1* | 6/2016 | Izadi | H04N 5/332 |
| | | | | 348/164 |
| 2016/0360074 | A1 | 12/2016 | Winer et al. | |

OTHER PUBLICATIONS

Locatelli et al. "Imaging live humans through smoke and flames using far-infrared digital holography" Optical Society of America, vol. 21, No. 5; Publication [online]. Feb. 26, 2013 [retrieved Apr. 4, 2019]. Retrieved from the Internet: <URL: https://www.osapublishing.org/oe/fulltext.cfm?uri=oe-21-5-5379&id=249517>;pp. 1-12.

\* cited by examiner

*Primary Examiner* — Obafemi O Sosanya
(74) *Attorney, Agent, or Firm* — Arch & Lake LLP

(57) ABSTRACT

An example holographic video recording system comprises: a first group of cameras positioned at a first position, a second group of cameras positioned at a second position, and a third group of camera including a third infrared camera. The first group of cameras includes a first infrared camera and a first color camera; the second group of cameras includes a second infrared camera and a second color camera; and the third group of camera includes a third infrared camera spatially positioned between the first and second infrared cameras. A depth map may be calculated using the first infrared camera and the second infrared camera in accordance with determining that an object is beyond a predefined distance from the holographic video recording system; or the first infrared camera and the third infrared camera in accordance with determining that the
(Continued)

object is within the predefined distance from the holographic video recording system.

20 Claims, 22 Drawing Sheets

Related U.S. Application Data

(60) Provisional application No. 62/441,828, filed on Jan. 3, 2017, provisional application No. 62/451,573, filed on Jan. 27, 2017.

(51) Int. Cl.
| | | |
|---|---|---|
| *G06T 7/55* | (2017.01) | |
| *G01B 11/245* | (2006.01) | |
| *H04N 5/33* | (2006.01) | |
| *H04N 17/00* | (2006.01) | |
| *H04N 5/232* | (2006.01) | |
| *H04N 9/04* | (2006.01) | |
| *G06T 7/80* | (2017.01) | |
| *G06T 7/194* | (2017.01) | |
| *G06T 7/70* | (2017.01) | |

(52) U.S. Cl.
CPC .......... *H04N 5/232* (2013.01); *H04N 5/23219* (2013.01); *H04N 5/33* (2013.01); *H04N 9/04* (2013.01); *H04N 17/002* (2013.01); *G06T 7/194* (2017.01); *G06T 7/70* (2017.01); *G06T 7/80* (2017.01); *G06T 2207/10024* (2013.01); *G06T 2207/10048* (2013.01); *G06T 2207/30196* (2013.01)

(58) Field of Classification Search
CPC .. G06T 7/593; G06T 7/55; G06T 7/70; G06T 2207/10028; H04N 5/2256; H04N 5/332; H04N 13/106; H04N 13/271; A63B 2024/0043; A63B 2220/05; A63B 2220/806; A63B 24/0003; A63B 63/00
See application file for complete search history.

HoloCams settup in living room

HoloCams settup on stage

900

902

Capture, using a first plurality of cameras, one or more video frames of an object in accordance with a synchronization check and an external parameter check

904

Reconstruct the one or more video frames

906 a segmentation process that produces a foreground mask for each video frame in the one or more video frames

908 a human body detection process that detects two or more body parts of a human pose captured in the one or more video frames in accordance with one or more foreground masks produced in the segmentation process and a human pose recognition technique

910 a tracking process executed in accordance with the human pose

912 a texturing process to produce a texture map

914 a packaging process that compresses mesh data, the texture map, and audio bit streams associated with the one or more video frames into a file having a predefined format for transmission to a user device

PROCESSING HOLOGRAPHIC VIDEOS

CROSS-REFERENCE TO RELATED APPLICATIONS

This application is a continuation of PCT Patent Application No. PCT/US2018/012272, filed Jan. 3, 2018, entitled "Processing holographic videos," which claims the benefit of U.S. Provisional Patent Application No. 62/441,828, filed Jan. 3, 2017, entitled "Method and Apparatus for holographic video recording," and to U.S. Provisional Patent Application No. 62/451,573, filed Jan. 27, 2017, entitled "Method and Apparatus for Capturing, Generating and Viewing Holographic Video," both of which are incorporated by in their entireties and for all purposes along with all other references cited in this application.

TECHNICAL FIELD

The present disclosure relates generally to computer graphics and more specifically to processing holographic videos.

BACKGROUND

Difficulties abound for processing and presenting high quality holographic videos. Many holographic projections, for example, are pre-programmed and are thus not capable of interacting with a user. Producing interactive holograms complicates the data encoding because programmers have to anticipate a large number of possible situations and the responses thereto.

Many holographic video capturing and displaying components are also expensive to implement. Although the prices of light modulators and other components have lowered in recent years, the cost of hologram at big scale can still be prohibitive.

Third, many holographic communications consume a tremendous amount of transmission bandwidth, rendering it impractical or unsatisfactory for implementation on mobile user devices, such as smartphones.

The above identified technical problems are reduced or eliminated by the systems and methods disclosed herein.

SUMMARY

Systems and methods for processing holographic videos are disclosed in the present disclosure. An example holographic video recording system comprises: a first group of cameras positioned at a first position, a second group of cameras positioned at a second position, and a third group of camera including a third infrared camera. The first group of cameras includes a first infrared camera and a first color camera; the second group of cameras includes a second infrared camera and a second color camera; and the third group of camera includes a third infrared camera spatially positioned between the first and second infrared cameras. A depth map may be calculated using the first infrared camera and the second infrared camera in accordance with determining that an object is beyond a predefined distance from the holographic video recording system; or the first infrared camera and the third infrared camera in accordance with determining that the object is within the predefined distance from the holographic video recording system.

The example holographic video recording system may include a predetermined group of cameras and each group of cameras in the predetermined group of cameras includes at least a color camera and an infrared camera.

The distance between the first position and the second position may be fixed or adjustable. In the latter case, the distance between the first position and the second position may be automatically adjusted in accordance with a position of a mobile object.

The example holographic video recording system may further comprise an infrared pattern projector configured to project light to an object.

The infrared pattern projector is further configured to adjust light projection to the object in accordance with feedback from any camera included in the holographic video recording system.

A method for processing holographic video may comprise: capturing, using a first plurality of cameras, one or more video frames of an object in accordance with a synchronization check and an external parameter check; reconstructing the one or more video frames, including: a segmentation process that produces a foreground mask for each video frame in the one or more video frames; a human body detection process that detects two or more body parts of a human pose captured in the one or more video frames in accordance with one or more foreground masks produced in the segmentation process and a human pose recognition technique; a tracking process executed in accordance with the human pose; a texturing process to produce a texture map; and a packaging process that compresses mesh data, the texture map, and audio bit streams associated with the one or more video frames into a file having a predefined format for transmission to a user device.

The method may further comprise an offline camera calibration process that calibrates the plurality of cameras using a camera calibration rig.

The method may further comprise transmitting a trigger signal to the first group of cameras and to the second group of cameras to cause a camera in the first group of cameras to capture a video frame and to cause a camera in the second group of cameras to capture a video frame.

The synchronization check may comprise: comparing a first total of video frames captured, in a predefined time period, by a camera included in the first group of cameras with a second total of video frames captured, in the predefined time period, by a camera included in the second group of cameras.

The method may further comprise performing the synchronization check or the external parameter check at a predefined time interval.

The synchronization check may comprise: determining whether an audio frame captured by the camera and a video frame captured by the camera are synchronized.

The external parameter check may comprise: comparing videos frames captures by two cameras in a same group of cameras or from two different groups of cameras to determine whether a position of a camera has changed.

The human body detection process may comprise: detecting a human face in the one or more video frames using the human pose recognition technique.

The method may further comprise: applying a human face improvement process after detecting the human face.

The human body detection process may comprise detecting a predefined human body part in the one or more video frames using the human pose recognition technique.

The tracking process may comprise a depth-depth tracking process or a mesh-mesh tracking process.

The predefined format may be MP4 format. The packaging process may comprise compressing the mesh data into a caption track of the MP4 file.

The method may further comprise wirelessly transmitting the file having the predefined format to a mobile user device.

The method may further comprise decoding the file to render one or more holographic video frames on the mobile user device.

The method may further comprise causing a second one or more video frames capture by a camera of the mobile user device and the one or more holographic video frames to be concurrently displayed on the mobile user device.

The rendering the one or more holographic video frames on the mobile user device may include rendering a portion of a holographic video frame in accordance with a confidence value assigned to the portion of the holographic video frame.

The texturing process to produce the texture map may include a spatial inpaint process, a green area removal process, and a temporal inpaint process.

An example camera calibration rig may comprise a plurality of vertical levels; and a plurality of faces for each level in the plurality of vertical levels. Each face in the plurality of faces includes a chess board pattern, and each white area in the chess board pattern includes a different QR code.

The chess board pattern may include two or more QR codes that are configured to identify boundaries of the chess board pattern to a camera.

BRIEF DESCRIPTION OF THE DRAWINGS

FIG. 9 is a flowchart illustrating a method for processing holographic videos in accordance with some implementations.

DETAILED DESCRIPTION

Figure 1:
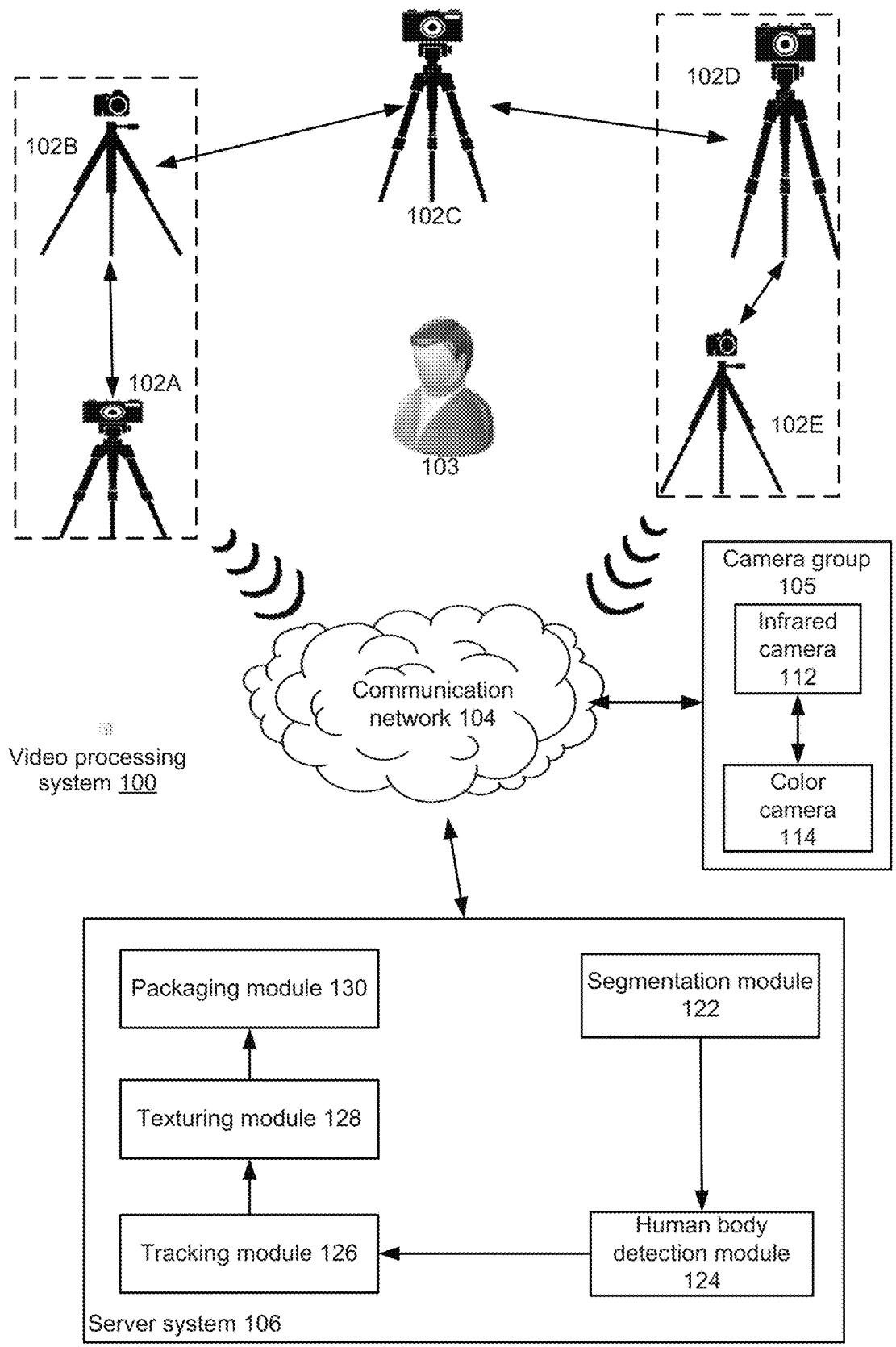
FIG. 1 is a block diagram illustrating a video processing system in accordance with some implementations.

FIG. 1 is a block diagram illustrating a video processing system 100 in accordance with some implementations.

In some implementations, the video processing system 100 includes one or more cameras 102 (e.g., camera 102A, 102B, 102C, 102D, and 102E), a communication network 104, and a server system 106.

In some implementations, two or more camera, such as an infrared camera 112 and a color camera 114, may constitute a camera group 105, which may also be referred to as a camera pod in the present disclosure. For example, cameras 102A and 120B may be included in a camera group; and cameras 102D and 102E may be included in another camera group.

In some implementations, the communication network 104 interconnects one or more cameras 102 with each other, and with the server system 106. In some implementations, the communication network 104 optionally includes the Internet, one or more local area networks (LANs), one or more wide area networks (WANs), other types of networks, or a combination of such networks.

In some implementations, the server system 106 includes a segmentation module 122, a human body detection module 124, a tracking module 126, a texturing module 128, and a packaging module 130. Detail functionalities provided by each of these modules are explained below with references to relevant figures.

Figure 2:
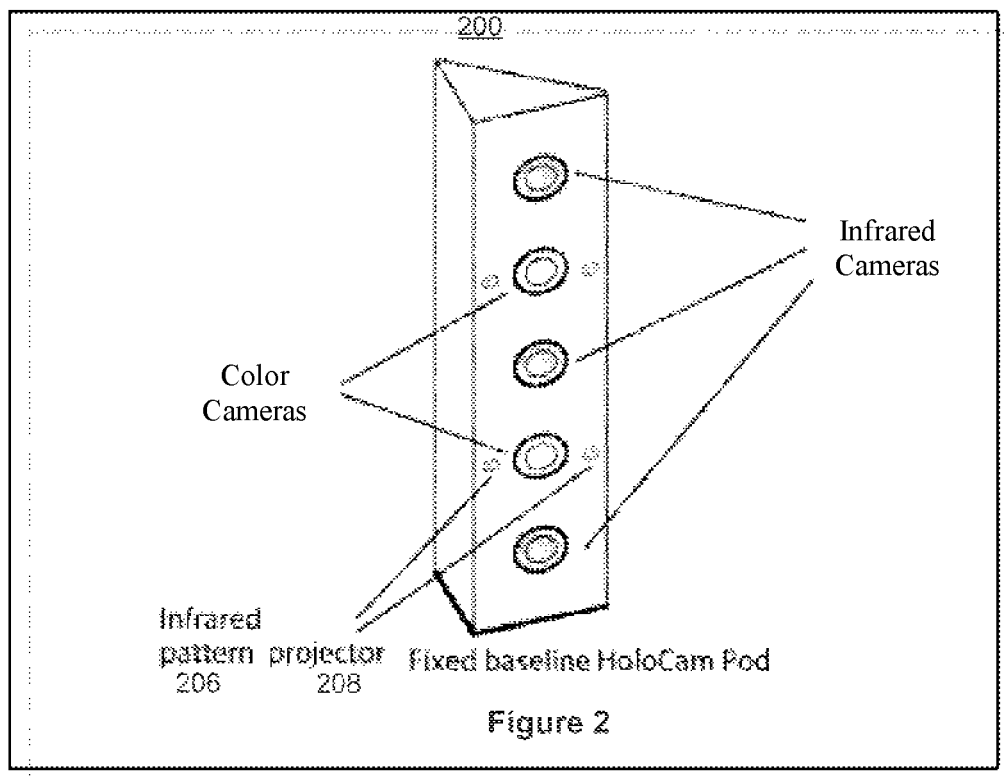
FIG. 2 is a block diagram illustrating a camera pod in accordance with some implementations.

FIG. 2 shows an example fixed baseline holographic video recorder 200. The recorder 200 includes one or more infrared video cameras (e.g., IR cameras), one or more color video cameras (e.g., RGB cameras), and one or more infrared pattern projectors. The example recorder 200 shown in FIG. 2 includes 3 IR cameras and 2 RGB cameras, which are placed in a linear fashion from the top to the bottom of the recorder 200, alternating one RGB camera with one IR camera. The distance between adjacent cameras is the same in the example recorder 200.

Figure 3:
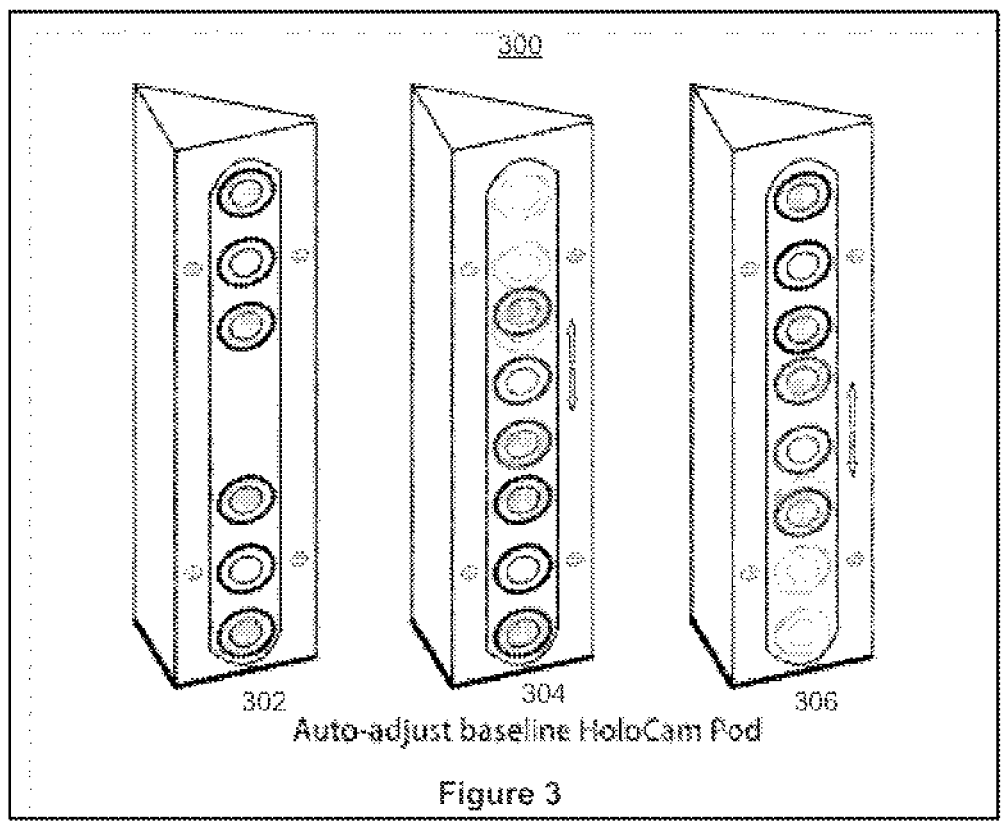
FIG. 3 is a block diagram illustrating a second camera pod in accordance with some implementations.

FIG. 3 shows an example auto-adjusting baseline holographic video recorder 300. The recorder 300 includes two or more infrared video cameras (e.g., IR cameras), two or more color video cameras (e.g., RGB cameras), two or more infrared pattern projectors, and one or more positioning deices (e.g., a slideway or a motor). As shown in FIG. 3, the example recorder 300 includes 4 IR cameras and 2 RGB cameras. As also shown in FIG. 3, the example recorder 300 includes two camera groups, each of which includes 2 IR cameras and 1 RGB camera. In some implementations, the distances among cameras within a same group may be fixed. The distance between two camera groups, however, may be adjusted, for example, by way of using a motor to move a camera group up or down or left to right, or vice versa.

Figure 4:
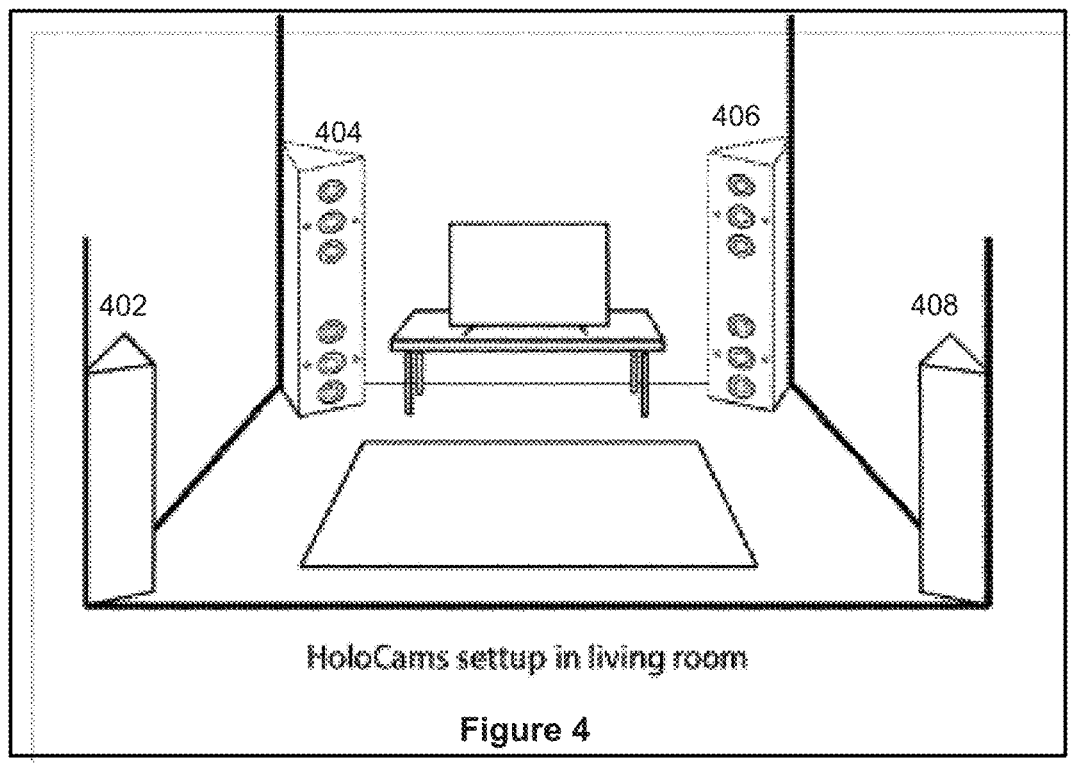
FIG. 4 is a block diagram illustrating a camera layout in accordance with some implementations.

FIG. 4 shows a layout 400 of holographic video recorders (e.g., one or more cameras or camera groups), for example, in an in-home setting. As shown in FIG. 4, holographic video recorders 402-408 may be placed at four corners of a space, such as a living room. Although FIG. 3 shows 4 recorders, the total number and positions of the recorders may be changed according to the size of the space and the total number of objects (e.g., a user, a pet, a chair, or a table) present in the space.

Figure 5:
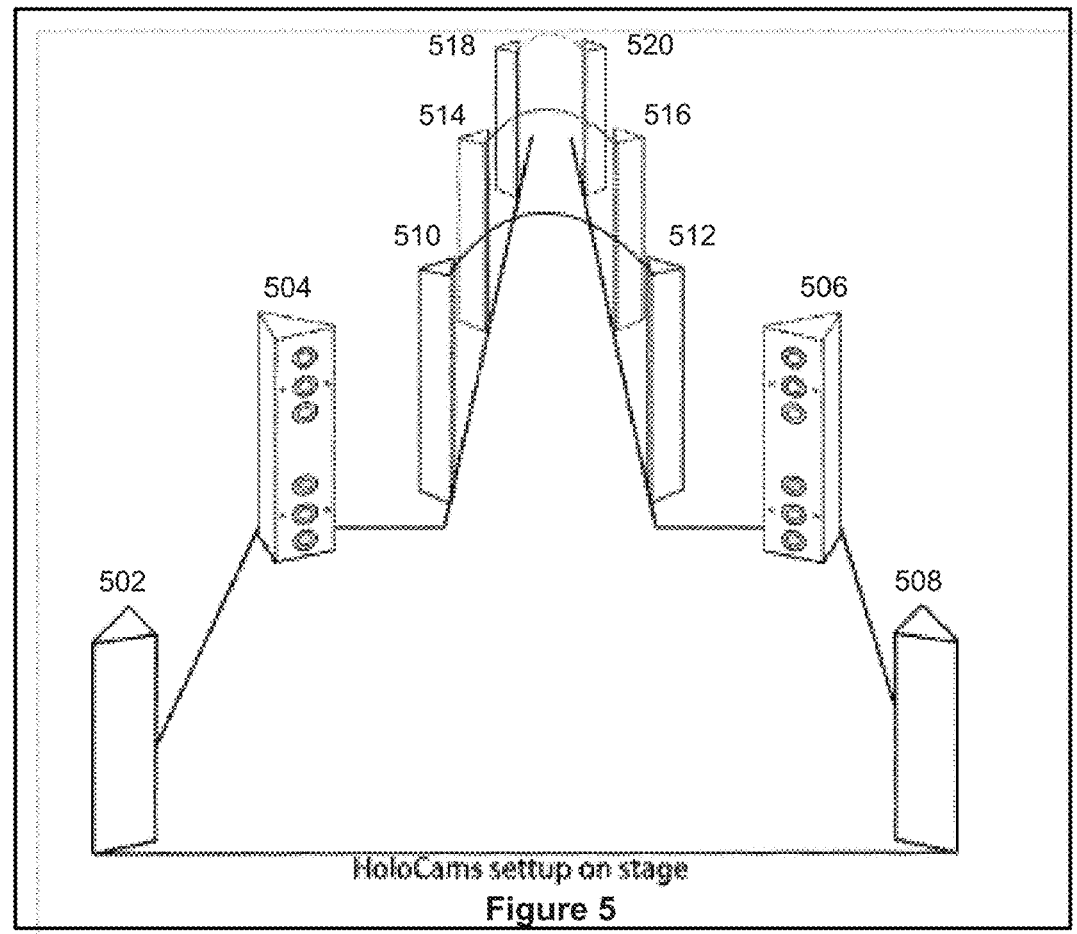
FIG. 5 is a block diagram illustrating a second camera layout in accordance with some implementations.

FIG. 5 shows another layout 500 of holographic video recorders, for example, in a stage setting. As shown in FIG. 5, holographic video recorders may be placed at a wedding stage, a modeling show stage, or a concert stage. As shown in this example layout, 4 recorders (e.g., 502-508) are placed at the four corners of the main stage and other recorders (e.g., 510-520) are placed along the corridor.

Figure 6:
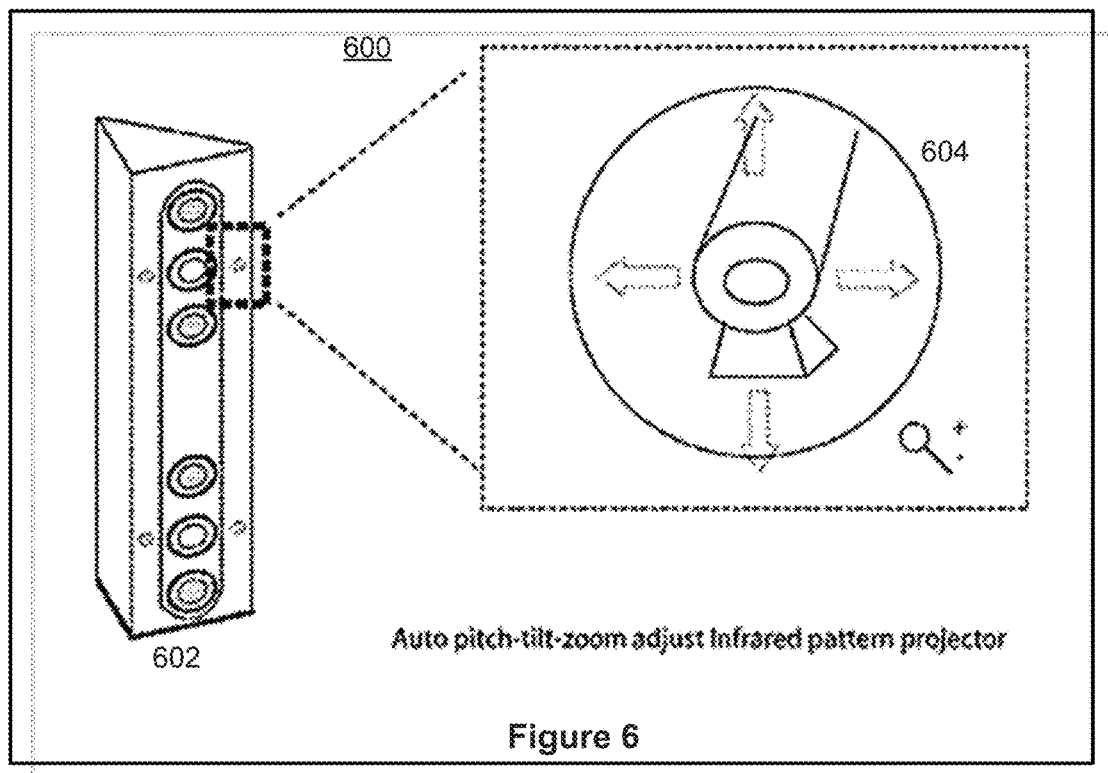
FIG. 6 is a block diagram illustrating a pattern projector in accordance with some implementations.

FIG. 6 shows details of an example infrared pattern projector 600. The projector can be adjusted in terms of pan, tilt, and, zoom. When the camera recognizes a person or a predefined object or shape (e.g., a human person or a human face) or a movement thereof, the projector can pan, tilt and zoom to focus on that predefined object.

Figure 7:
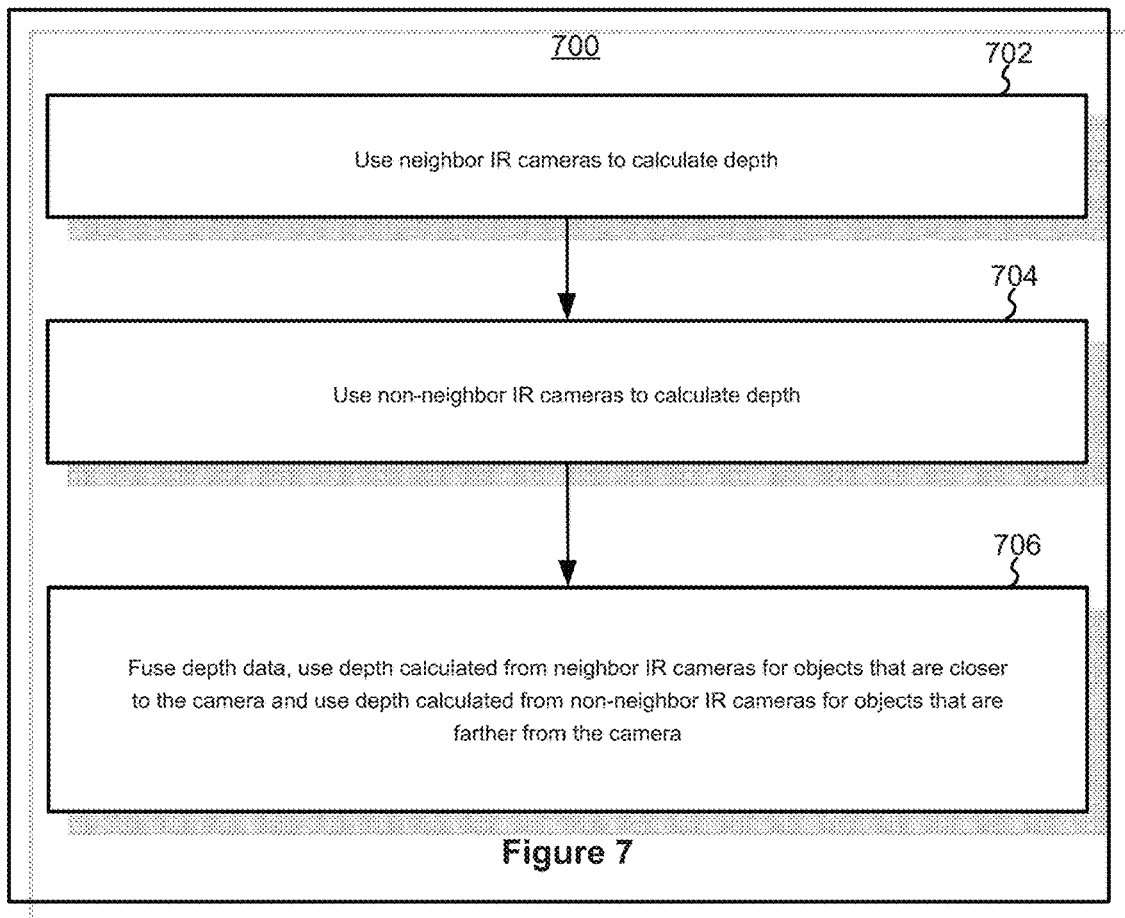
FIG. 7 is a flowchart illustrating a method for calculating depth in accordance with some implementations.

FIG. 7 shows a depth sensing method 700 using the example holographic video recorders. Because there are multiple baselines for the IR cameras, IR cameras can cover more range and provide more accurate depth map. As shown in FIG. 7, at step 702, two neighboring IR cameras may be used to calculate a first depth map. At step 704, two non-neighboring IR cameras may be used to calculate a second depth map. At step 706, the depth maps produced at steps 702 and 704 may be fused by using depth calculated from neighboring IR cameras for objects that are closer to the camera or using depth calculated from non-neighboring IR cameras for objects that are farther from the camera.

Figure 8:
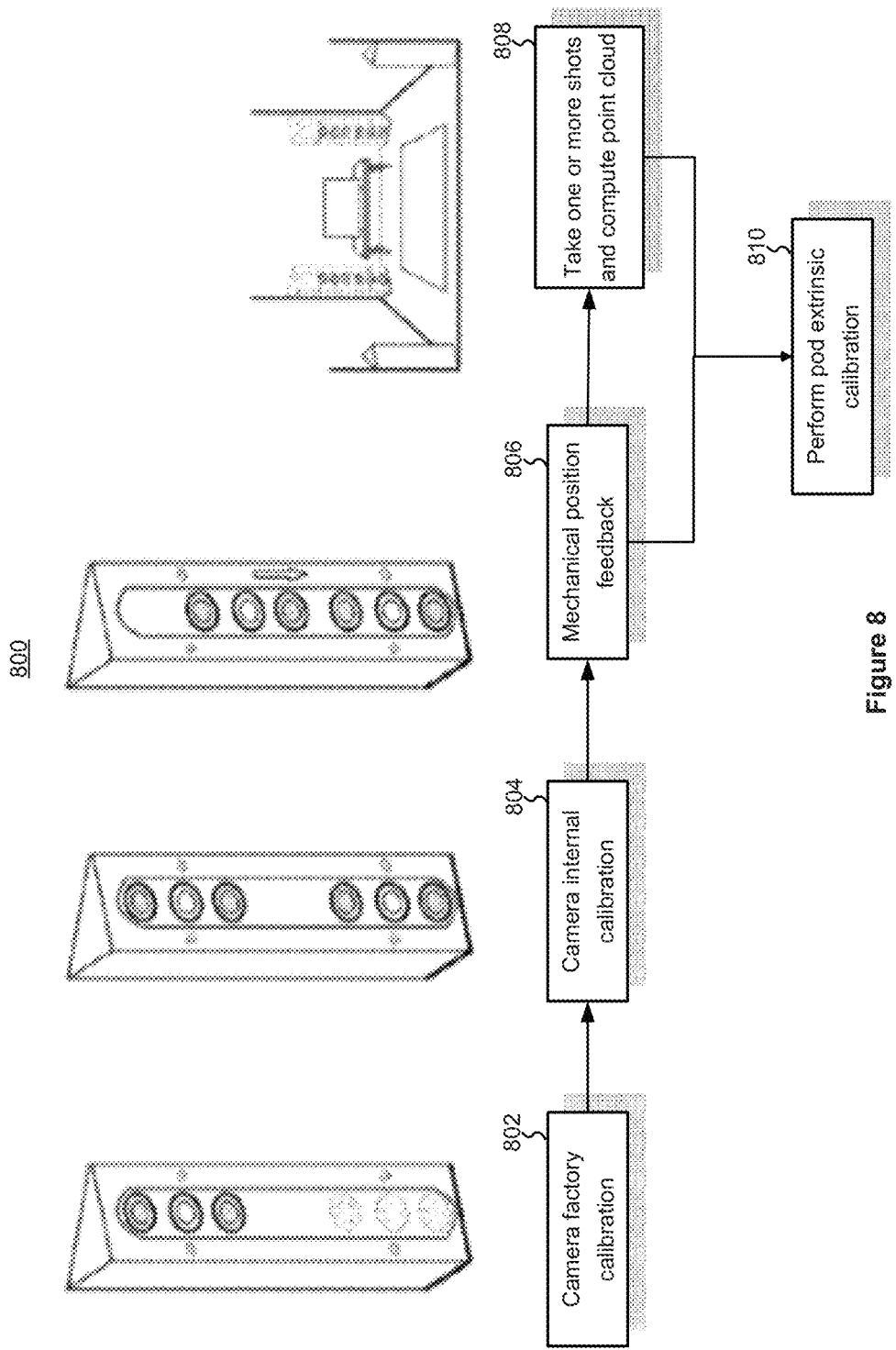
FIG. 8 is a block diagram illustrating a method for calibrating cameras in accordance with some implementations.

FIG. 8 shows an example method 800 for calibrating holographic video recorders. First, a camera factory calibration may be performed (802). Then, an intrinsic calibration for each camera (IR camera or RGB camera) may be performed (804), which may include calibrating the external parameter between all the cameras grouped in a recorder (or a camera group). Next, a mechanical position feedback (806) is performed, which sets an initial value for the cameras that has been moved. A point cloud is then generated based on depth map data (808). One or more calibrations between pods may also be performed (810). Performing a pod calibration includes using the data produced from steps 806 and 808, along with known intrinsic parameters and external parameters determined for a single camera pod, to perform a registration algorithm to determine the external parameters between different camera pods.

FIG. 9 is a flowchart illustrating a method 900 for processing holographic videos in accordance with some implementations.

As shown in FIG. 9, the method 900 for processing holographic video may include: capturing (902), using a first plurality of cameras, one or more video frames of an object in accordance with a synchronization check and an external parameter check; and reconstructing (904) the one or more video frames.

Reconstructing (904) the one or more video frames may include: a segmentation process (906) that produces a foreground mask for each video frame in the one or more video frames; a human body detection process (908) that detects two or more body parts of a human pose captured in the one or more video frames in accordance with one or more foreground masks produced in the segmentation process and a human pose recognition technique; a tracking process (910) executed in accordance with the human pose; a texturing process (912) to produce a texture map; and a packaging process (914) that compresses mesh data, the texture map, and audio bit streams associated with the one or more video frames into a file having a predefined format for transmission to a user device.

Figure 10:
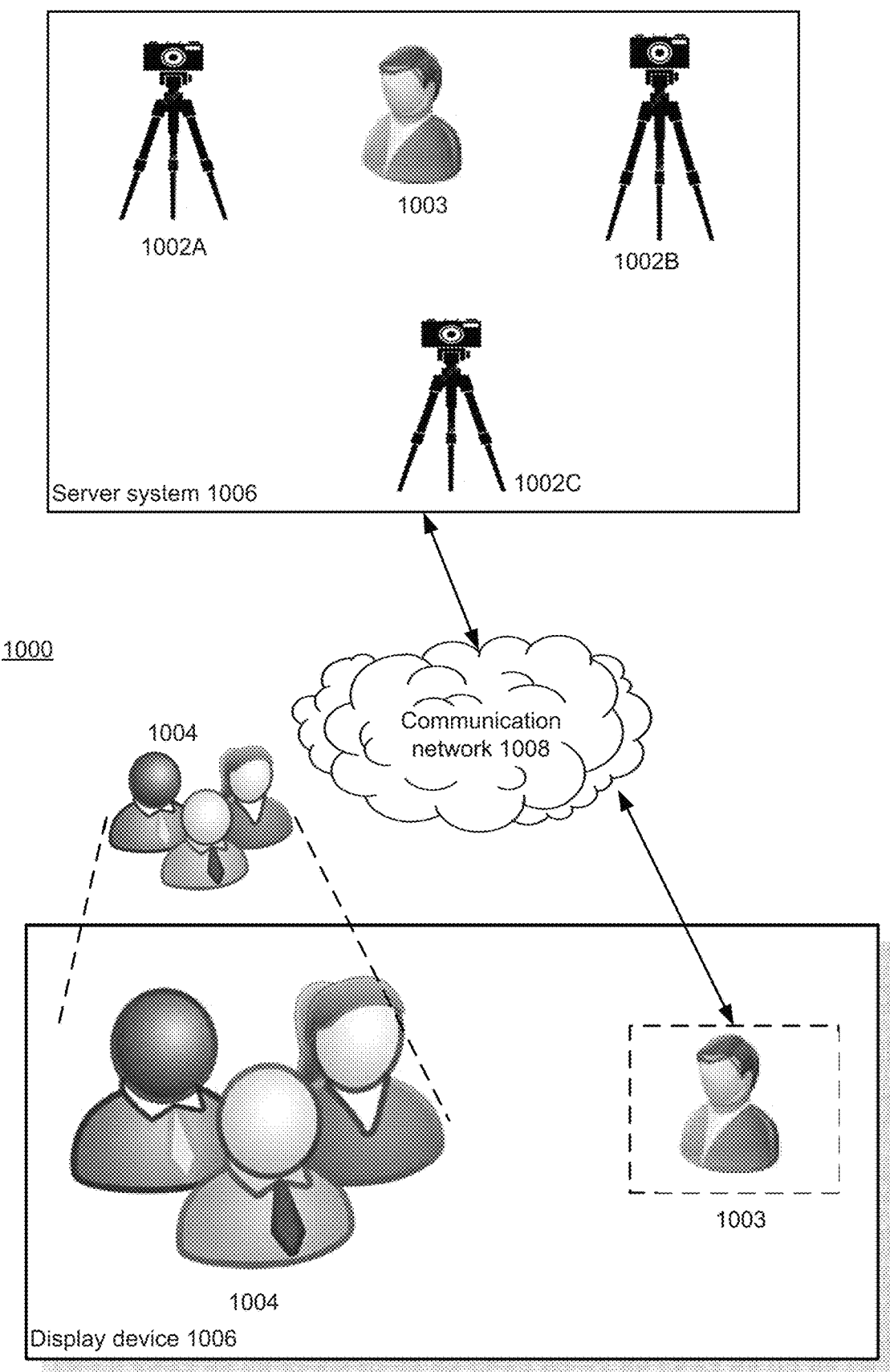
FIG. 10 is a block diagram illustrating a method for presenting holographic videos in accordance with some implementations.

FIG. 10 is a block diagram illustrating a method 1000 for presenting holographic videos in accordance with some implementations.

As shown in FIG. 10, one or more video frames of user 1003 (who is at location A, e.g., her home) may be captured using holographic video recorders 102A-102C. The captured video frames are then reconstructed and transmitted, through the communication network 1008 (e.g., a cellular network), to location B (user 1003's work office) for presentation.

As shown, unlike user 1003 (who is physically present at location A), users 1004 are physically present at location B. A display device 1006 may generate a composite video including the display of local users 1004 and the display of the remote user 1003. Further users 1004 may interact with the holographic representation of the user 1003 at location B. In these ways, the user 1003 is not required to be present at location B in order to holographically interact with the users 1004. These technical features can provide a teleconference feature.

FIG. 11-22 illustrate various components of an example end-to-end system for capturing, generating and viewing holographic videos. In the present disclosure, the term "holographic video" does not refer to a physical holographic video. Instead, the term "holographic video" refers to a dynamic 3D sequences with full 3D information that can be presented (displayed) on ARNR devices with immersive experience.

Figure 11:
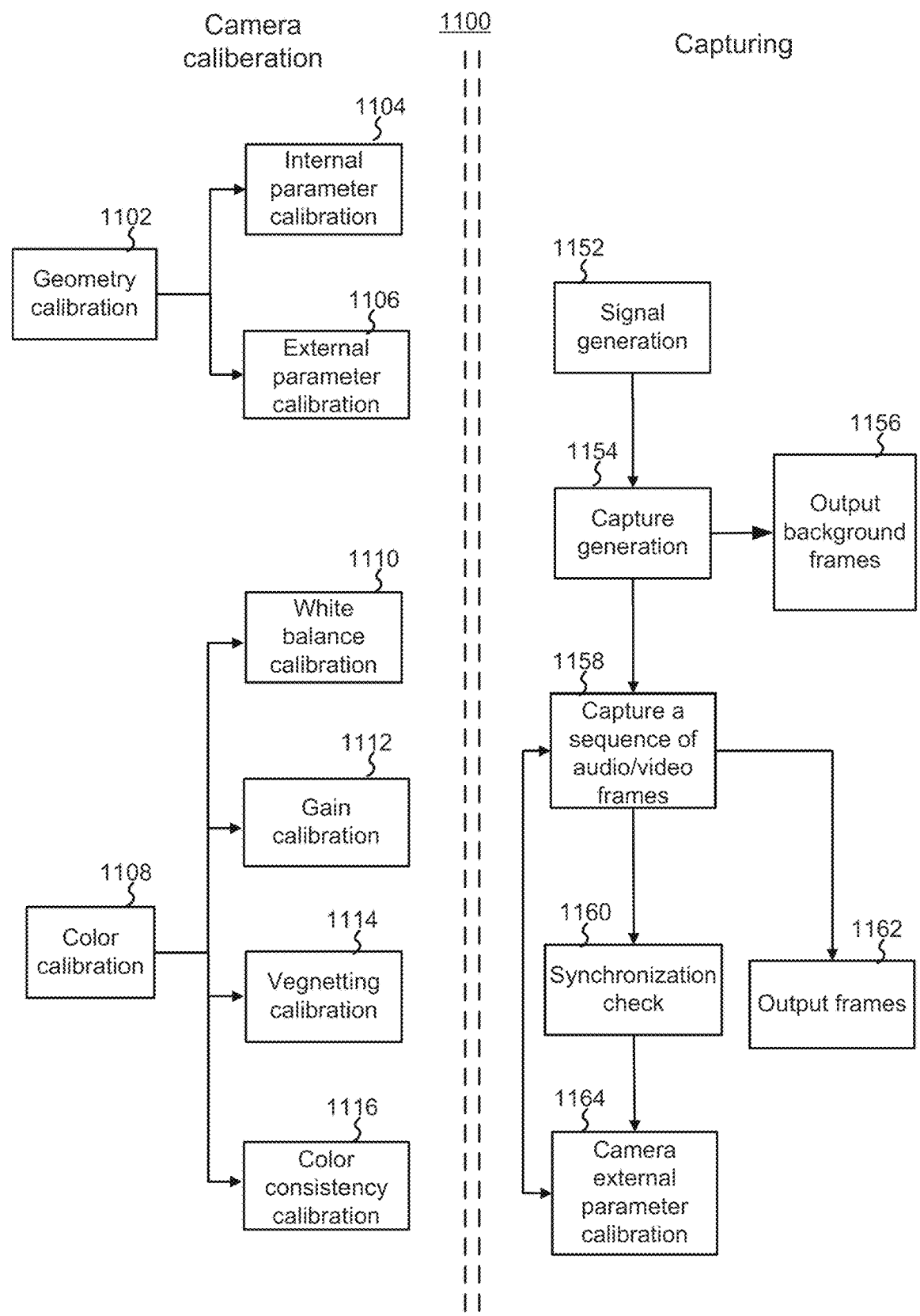
FIG. 11 is a block diagram illustrating a system for capturing video in accordance with some implementations.
Figure 12:
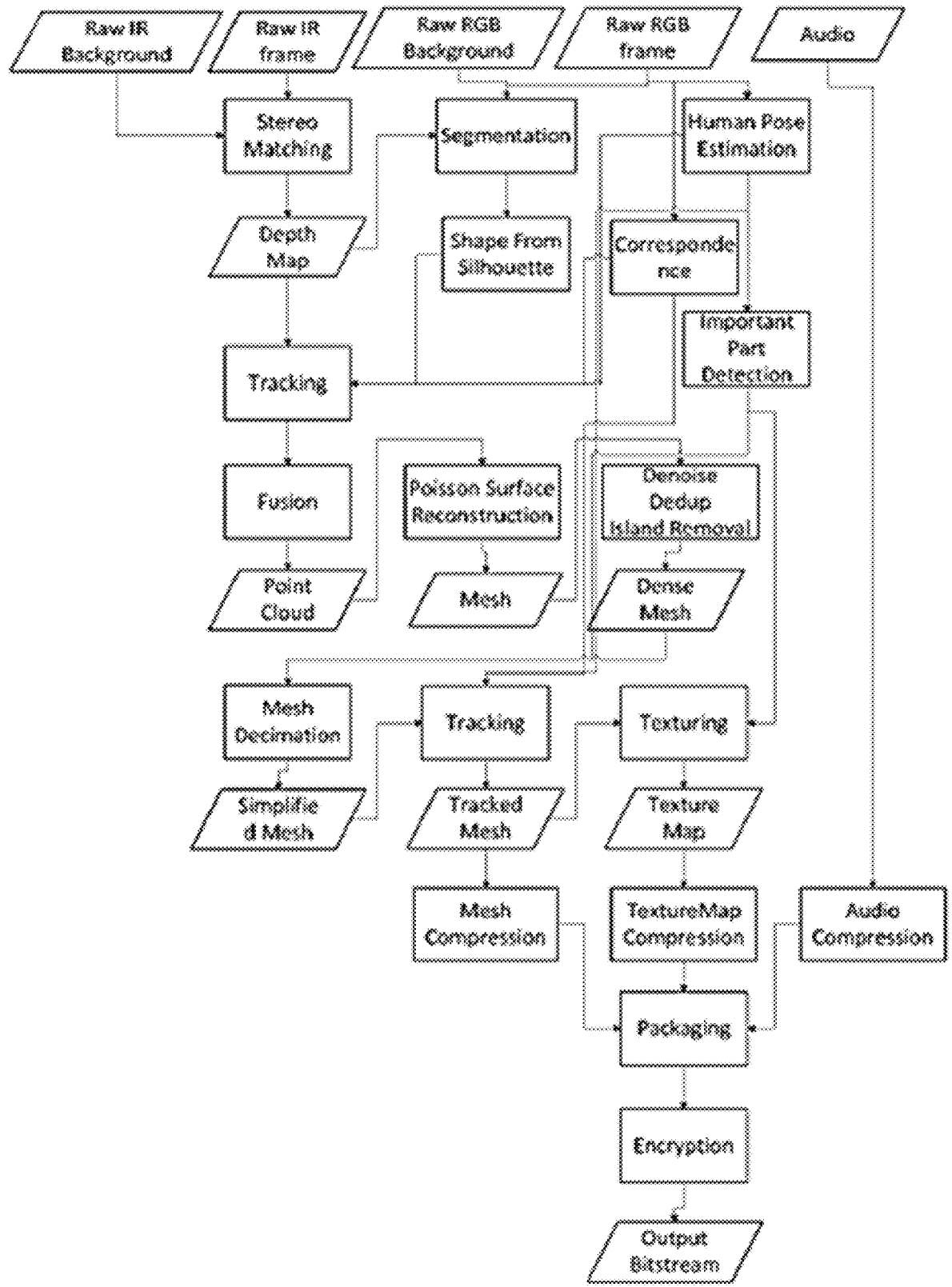
FIG. 12 is a block diagram illustrating a system for reconstructing video in accordance with some implementations.
Figure 13:
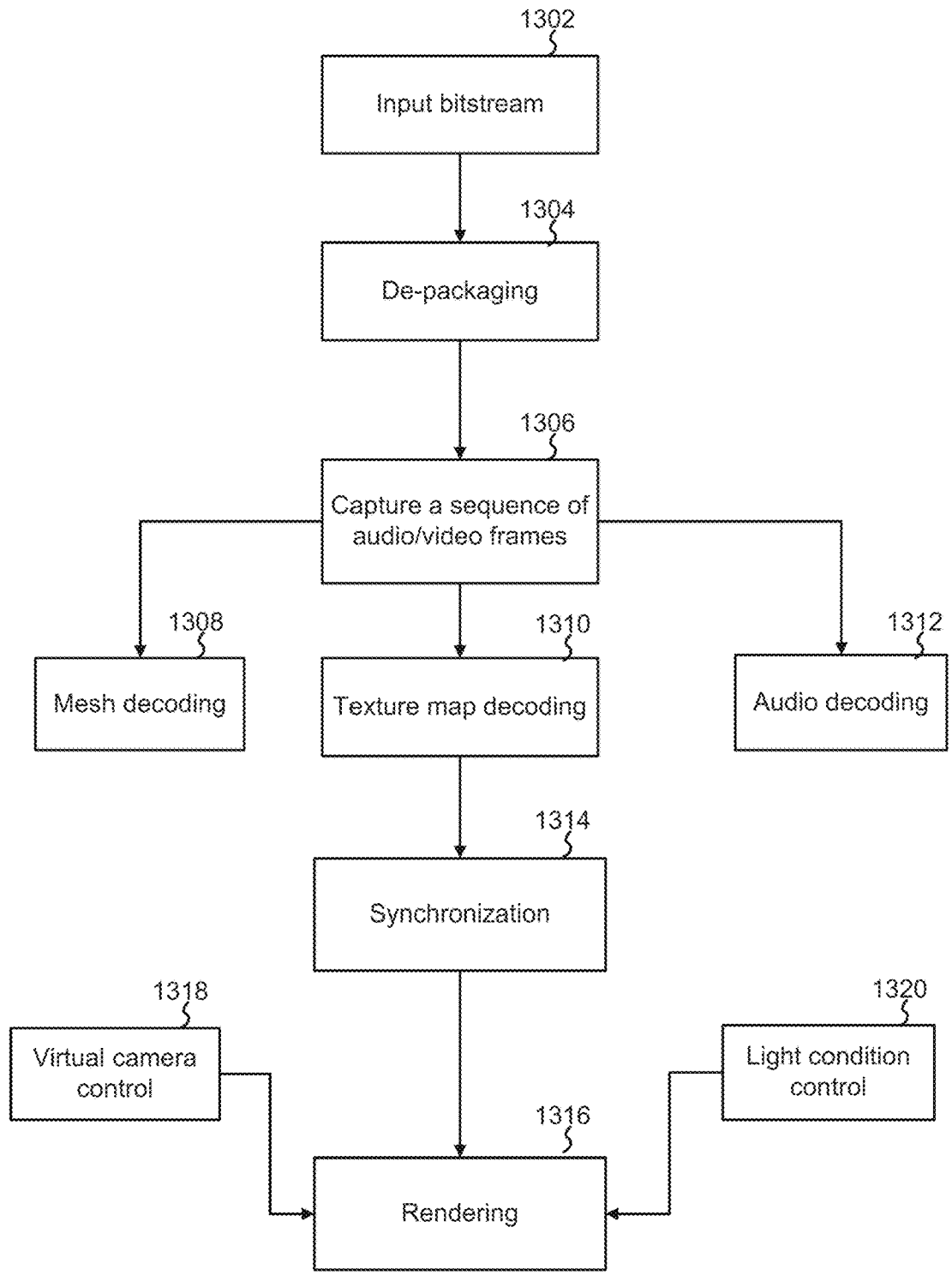
FIG. 13 is a block diagram illustrating a system for presenting video in accordance with some implementations.

The example end-to-end system may include at least three components, for example, a capturing system (as shown in FIG. 11), a reconstruction system (as shown in FIG. 12), and a player or a presentation system (as shown in FIG. 13).

FIG. 11 illustrates an example method 1100 for capturing holographic videos. The method 1100 may include an offline camera calibration step ( ) and an online capturing step. A camera calibration process may include a geometry calibration (1102) and a color calibration (1108). A geometry calibration (1102) may include an intrinsic parameter calibration (1104) and an external parameter calibration (1106); while a color calibration (1108) may include a white balance calibration (1110), a gain calibration (1112), a vegnetting calibration (1114), and a color consistency calibration (1116).

Figure 14:
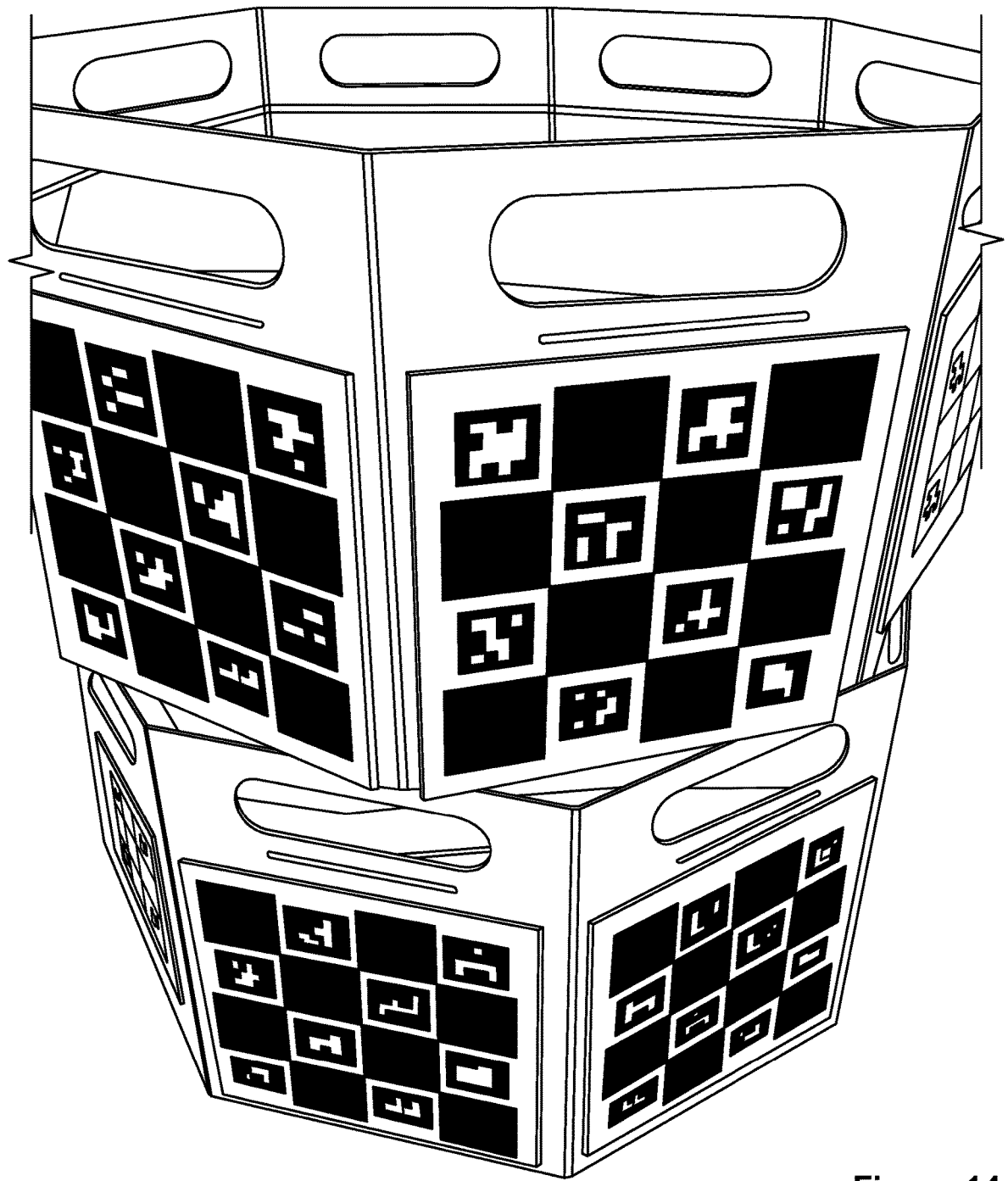
FIG. 14 is a block diagram illustrating a camera calibration rig in accordance with some implementations.

An example camera calibration rig 1400 is illustrated in FIG. 14. The camera calibration rig 1400 includes two or more floors, each of which may include multiple faces (e.g., 8 faces). Each face may include a chessboard pattern with QR code displayed at the white block. Each QR code displayed at a white block is coded differently and can be recognized so that the corner point of the chessboard can be localized.

Figure 15:
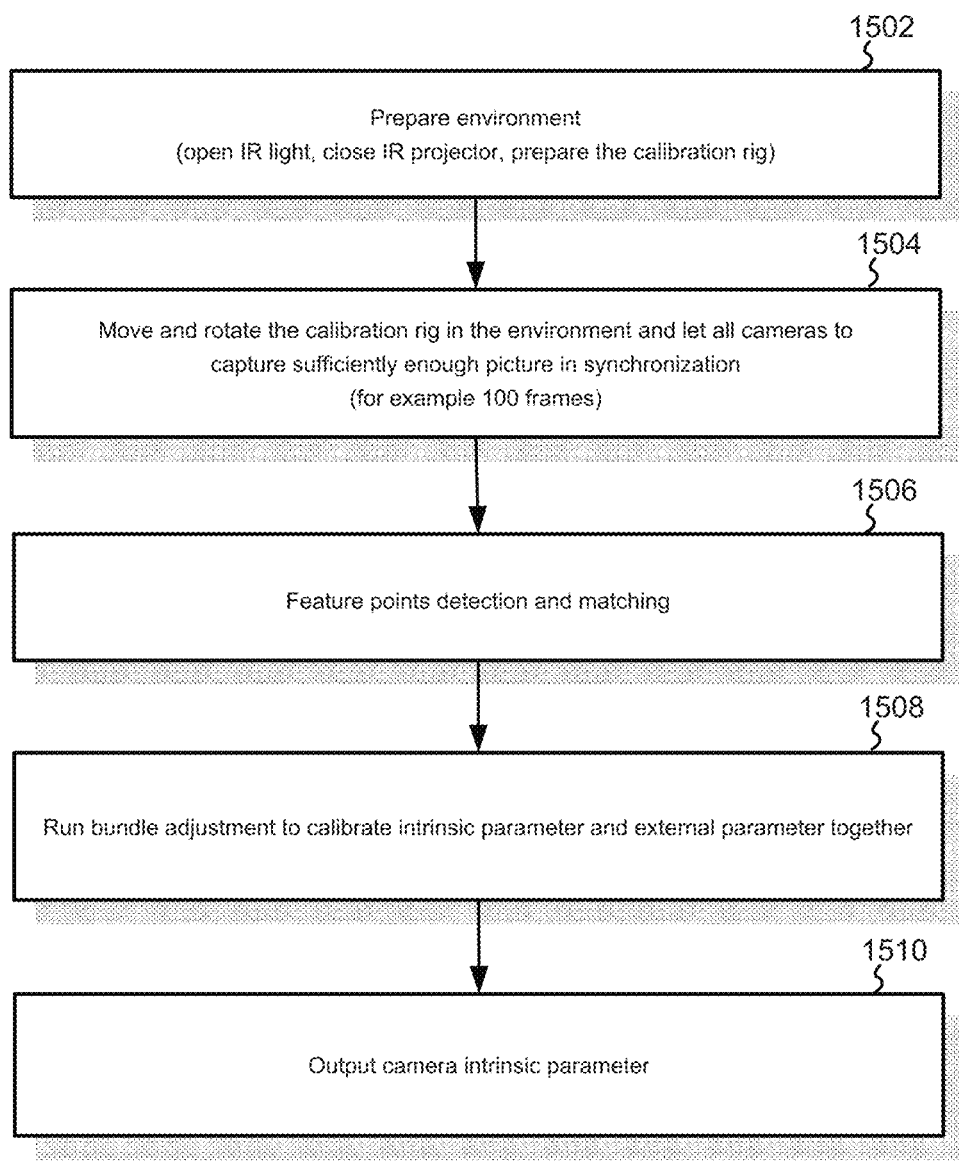
FIG. 15 is a flowchart illustrating a method for calibrating intrinsic parameters in accordance with some implementations.
Figure 16:
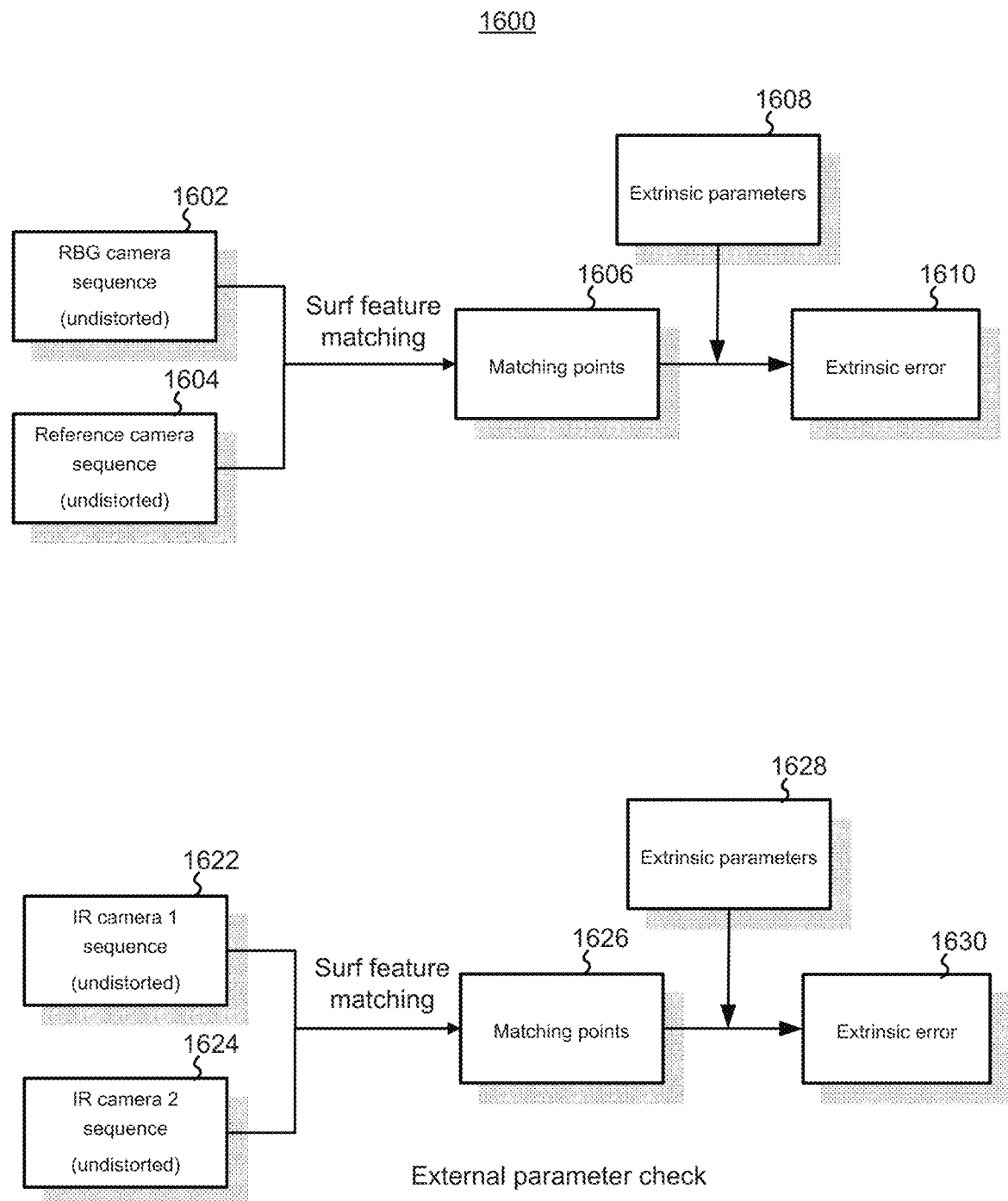
FIG. 16 is a flowchart illustrating a method for calibrating extrinsic parameters in accordance with some implementations.

FIG. 15 illustrate an example intrinsic parameter calibration process 1500. As shown in FIG. 15, at the process 1500 may begin with the environment being prepared by turning on one or more IR lights, turning off an IP projector, and placing a calibration rig (e.g., the rig 1400) in the middle of the cameras to be calibrated (1502). The camera calibration rig is then moved and/or rotated in the environment to allow the cameras to capture a sufficient number of video frames in synchronization (1504). In some implementations, 100 frames is considered a suffice number. Then, a feature points detection technique is used to detect the corner points of the chessboard (1506). By taking advantage of the QR code and data encoded therein, corner points between different cameras can be matched. Bundle adjustment may then be run to calibrate intrinsic parameters and external parameters (1508). The intrinsic parameters may be to outputted (1510).

The online capturing pipeline shown in FIG. 11 may include the following steps. First a signal generator generates a trigger signal at a constant frequency. Once the camera receives the trigger signal, it will capture a frame. Background frames are first captured. After that, all the cameras start to capture the whole scene in synchronization with the microphone's capturing audio. A synchronization check and an external parameter check may be performed once every a few frames to make sure the previous frames are in sync and the external parameter is usable. If a synchronization check or an external parameter check fails, cameras will stop outputting frames and ask the user to re-sync/re-calibrate the capturing the system before proceeding.

The pipeline of the external parameter check module is shown in FIG. 6. It has two checks. One is for in-pod checking and the other is for between-pod checking. The only difference between these two checks is that in-pod checking use the data from the cameras inside a pod to do the checking while between-pod checking use the data from cameras across pods. For both pipelines, after the camera is chosen, it will extract surf feature points and do matching between cameras.

Then the original external parameter will be used to calculate the error. If an error is larger than a threshold (for example, 1 pixel), it may be concluded that the camera position or rotation has been changed.

The equation of calculating the error is shown as following. Assume n matching points have been found between the two cameras that are $\{a11, a12, a13 \ldots a1n\}$, $\{a21, a22, a23 \ldots a2n\}$, the 3D points $\{p1, p2, p3 \ldots Pn\}$ in the space can be calculated by using the original external parameter.

Then the 3D points are projected back to the 2D plane again to get $\{a;1, a;2, a;3 \ldots a;n\}$ and the error can be calculated by using the following equation.

$$\text{Error} = \Sigma_1^n 0.5 \times \|a_{11} - a'_{11}\|^2 + 0.5 \times \|a_{21} - a'_{21}\|^2$$

FIG. 12 illustrates an example method 1200 for reconstructing holographic videos. The method 1200 includes, among other things, a segmentation process (FIG. 17), a human body part identification process (FIG. 18), a tracking process (FIG. 19A or 19B), a face improvement process (FIG. 20), and a texturing process (FIG. 21).

FIG. 13 illustrates an example process 1300 for presenting or displaying holographic videos. It firstly receives an input bitstream. It does depackaging and decryption. Then mesh decoding, texturemap decoding and audio decoding are done in parallel. The three tracks will be synchronized by the time stamp. The according to the camera position and camera lookat direction plus the light condition, the player will render the view one frame after the other.

Figure 17:
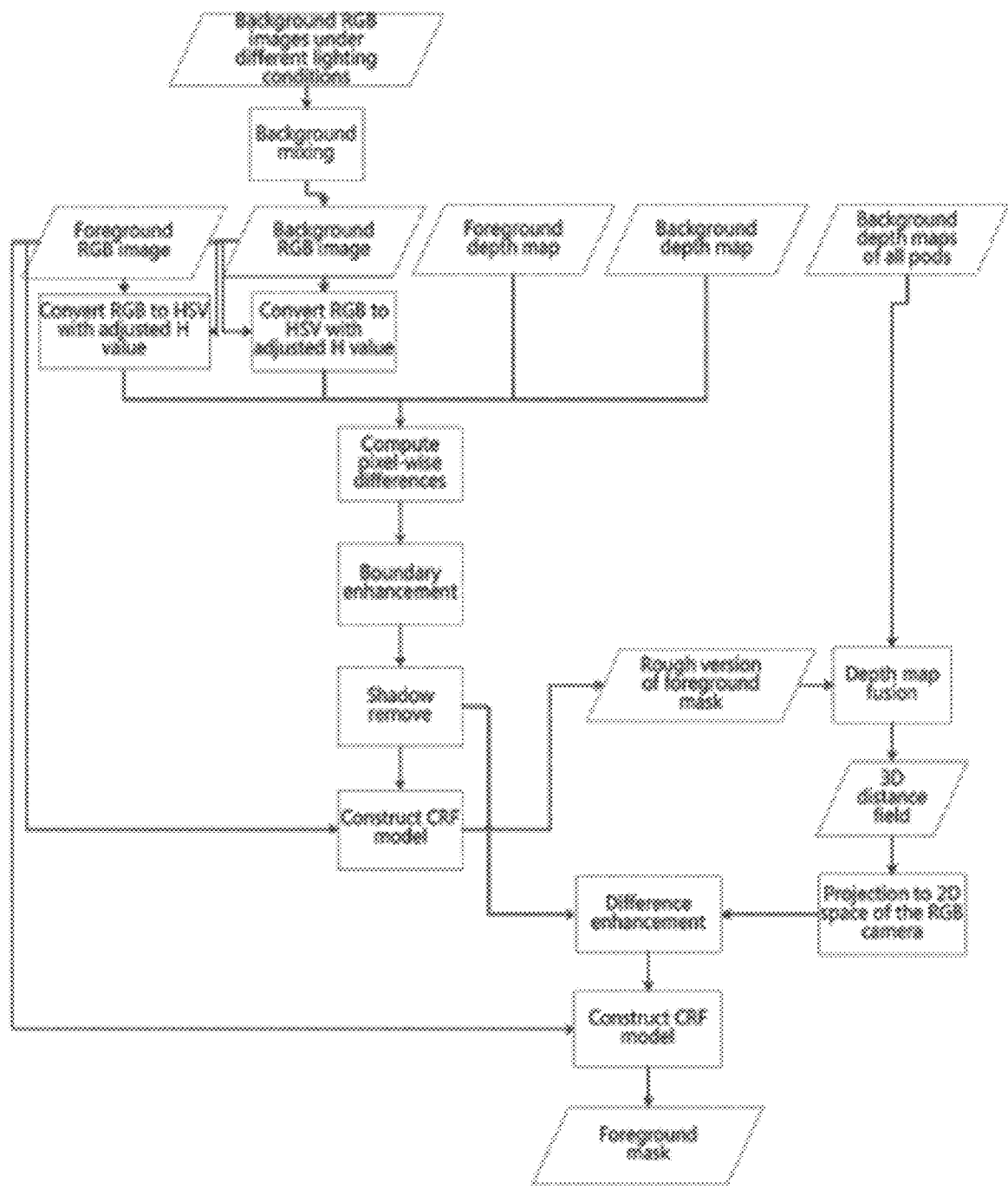
FIG. 17 is a flowchart illustrating a segmentation process in accordance with some implementations.

FIG. 17 illustrates an example segmentation process 1700. For each pod in each frame, a foreground mask is produced. The segmentation is based on the fully connected conditional random field (CRF) model, which is comprised of a pixel-wise unary energy function that reflects the probability of each pixel being the foreground or background, and a pair-wise energy function that assists inference using pair-wise information.

The pair-wise term can keep the edges sharp and remove outliers. However, to obtain a correct foreground mask, it may be more important to find a good unary term, which is a function of the pixelwise differences between the foreground and the background images. Problem arises when a pixel has very close RGB values in the foreground and background images, and the depth information in this pixel might sometimes be invalid. To resolve this problem, obtain a rough version of the mask is obtained to generate a 3D distance field. Then with the help of the 3D distance field, a better unary term can be determined, and hence a foreground mask with higher quality.

An example process may include the following steps. The inputs to the process may include the foreground RGB image, several background RGB images under different lighting conditions, the background depth map, and the foreground depth map of all pods. First, the background RGB images may need to be processed, depending on whether fluorescent lamps or other lights that change intensity with alternating current power supply, or LED lamps that do not, are used. If fluorescent lamps are used in the studio, it is common that the foreground and the background images are taken under different lighting conditions, making it hard to compare the foreground and background directly. To resolve this problem, several background RGB images (typically 5 to 10) may be taken at random time points, and a linear combination of them may be taken to obtain a background RGB image that has a lighting condition close to the foreground.

After having a foreground RGB image and a background RGB image, the RGB of every pixel may be then converted to HSV, since HSV features have better performance in its application. Note that, for some pixel, if its R, G, and B values are very close to each other (e.g. max{R G, B}−min{R, G, B}<10) in both foreground image and background image, H may be set to be equal to 0(H=0) for both foreground and background. Then for each pixel i, the difference is computed, denoted by Xi, between foreground and background as follows $$X_i = w_0 + w_1|H_{if} - H_{ib}| + w_2|S_{if} - S_{ib}| + w_3|V_{if} - V_{ib}| + w_4 S\left(\frac{D_{ib} - D_{if}}{10}\right)$$

for each pixel. Here $S(x)=1-1/(1+e^x)$ is the sigmoid function. Since the depths near the boundary of the depth map are often invalid, $$X_1 \leftarrow \alpha X_i$$

some a greater than 1 is taken, if i is a pixel near the boundary. And since it is sometimes hard to deal with shadows (shadow area in the foreground image has much lower V values than in the background image, it can easily be labeled as foreground), depth:

$$X_i \leftarrow \beta X_i$$

is used for some f3 less than 1, if $$S\left(\frac{D_{ib} - D_{if}}{10}\right) < \text{Threshold}$$

(indicating that the foreground is very close to the background in depth).

Having computed Xi for each pixel i, the unary energy of each pixel is computed, along with the pairwise energy generated from the foreground RGB image, construct the complete CRF model, which, after its optimization problem is solved, outputs the foreground mask. This is still a rough version of the mask. Using this mask, a 3D depth filed can be generated by depth map fusion. The depth map fusion filters out background depth with the rough version of the segmentation mask and fuse the foreground depth into a volumetric representation of signed distance function. A TSDF and its confidence value are obtained for each voxel with depth fusion algorithm. The captured volume of our system is typically 2 m×2 m×2 m at the resolution of 512∧3 voxels. Projecting this 3D distance field to the 2D space of the RGB camera, the original feature Xi can then be refined by $$X_i \leftarrow \gamma X_i$$

if i is one of the projected points, where y is greater than 1.

Now the CRF model may be constructed to produce the output the refined version of the mask.

Figure 18:
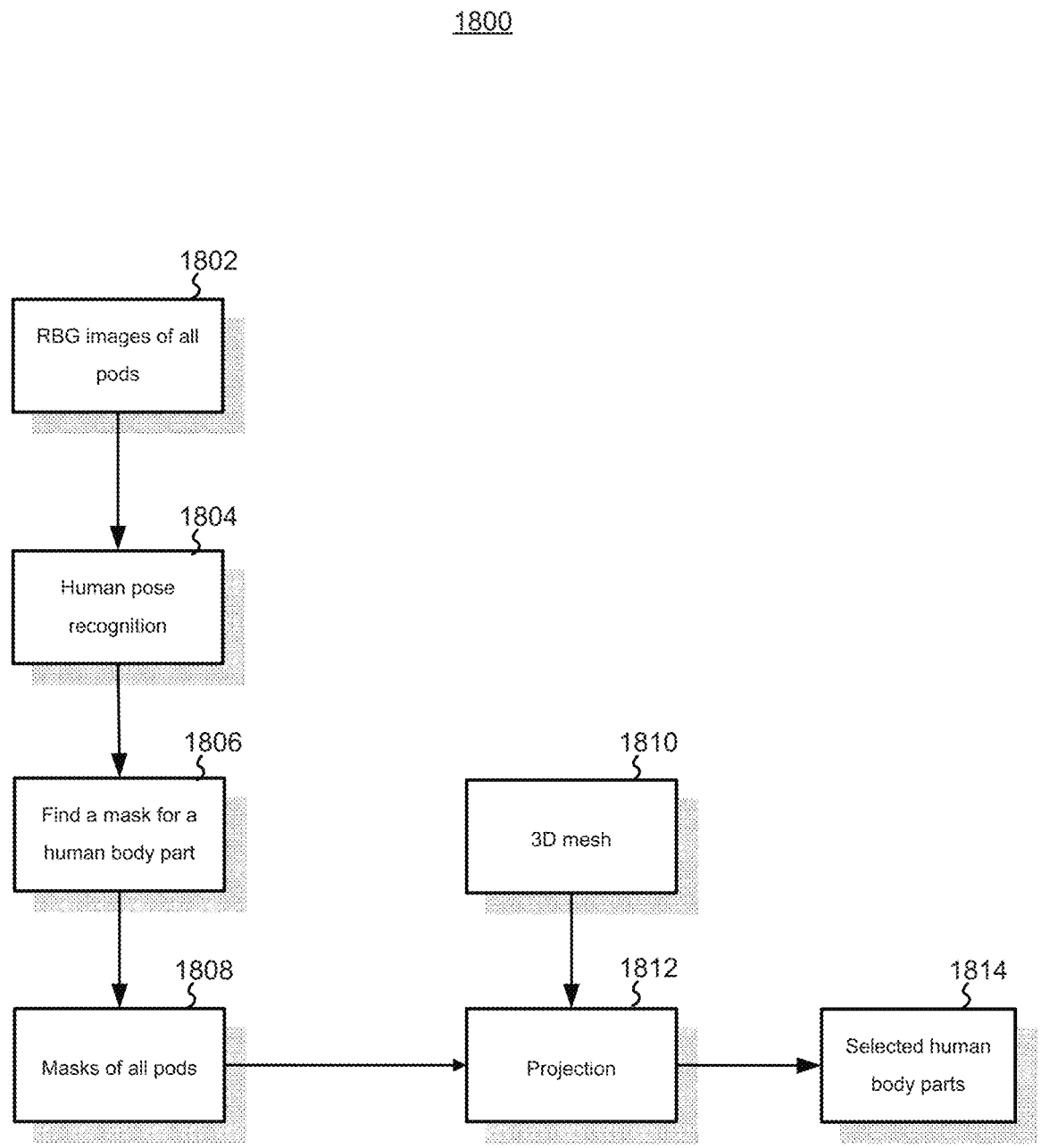
FIG. 18 is a flowchart illustrating a method for identifying human body parts in accordance with some implementations.

FIG. 18 illustrates an example human body part identification process 1800. There can be some important parts of a person that need to be reconstructed with more details. The detection of these important parts are based on the human pose recognition technique in 2D image, for example [3] [4]. Given an RGB image, it outputs the positions of all the human joints (wrists, shoulders, knees, etc) and some facial landmarks (eyes, ears and nose) with a good accuracy when people (can be more than one) are in various poses. Given a point in 3D mesh, we project it to every 2D image to see if it is within the area of the important parts—if so, the importance indicator of this point is added by one. Note that when we do the projection it is required that the angle between the normal of the point and the normal of the 2D space is within some range. We then say this point is indeed a point of some important part if its importance indicator is higher than some threshold. In the following we take face as an example to describe how we find the areas of important parts in a 2D RGB image. Other parts follow the same spirit.

Face detection: The human pose recognition has a good performance in finding facial landmarks as long as they can be seen, regardless you see the person's side face or the back side of the head.

1) If the nose is not detected, we say that we can only see the back of the head of the person. Therefore, face is not in this image. 2) If the nose is detected, we then find the smallest rectangle that contains all the person's detected landmarks. Let w be the width of the rectangle. Then we change the height to be 2*w, and the width to 5/3*w. without changing the center of the rectangle. This adjusted rectangle is regarded as the important area, i.e. face.

Figure 19A:
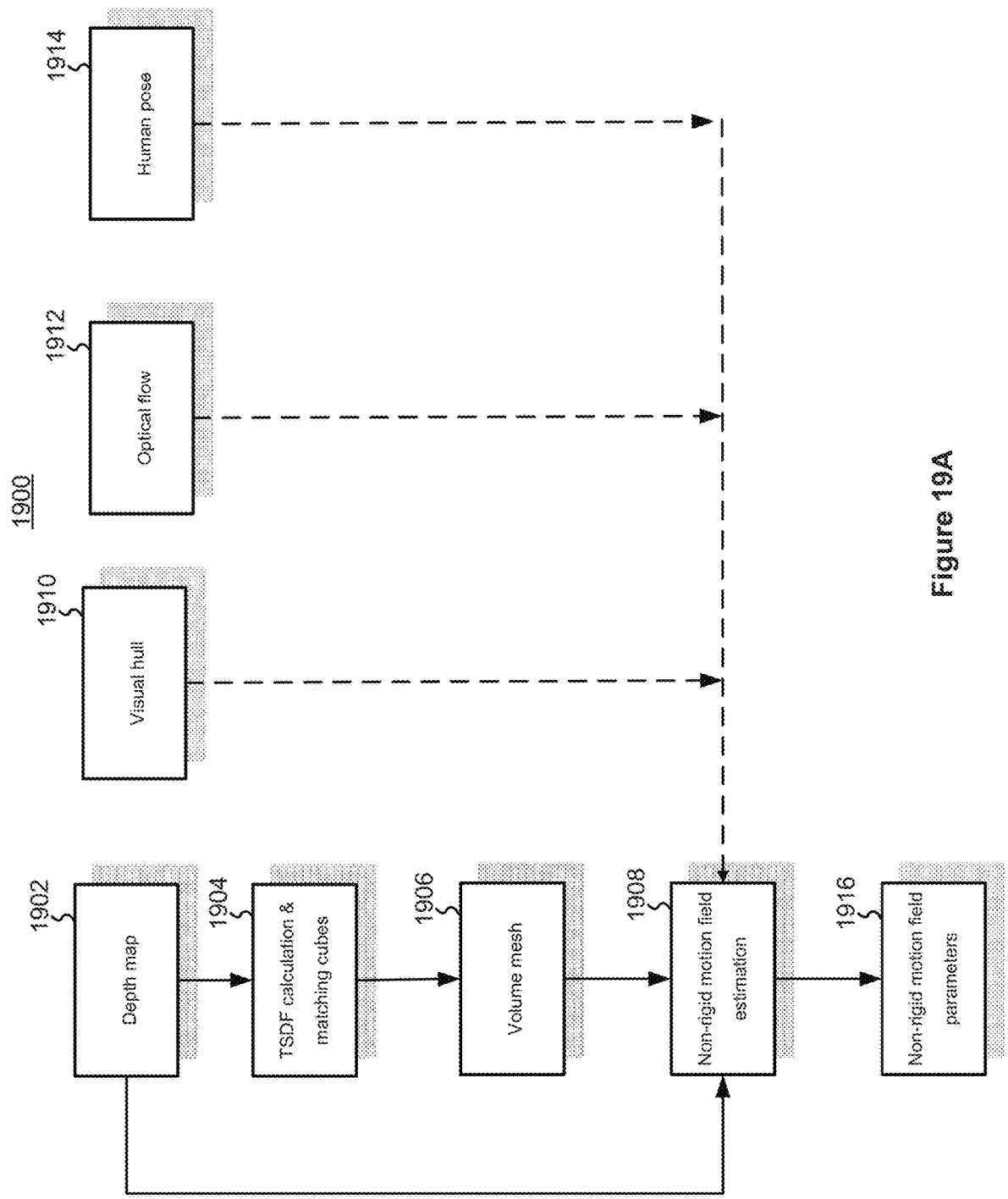
FIG. 19A is a flowchart illustrating a depth-depth tracking process in accordance with some implementations.
Figure 19B:
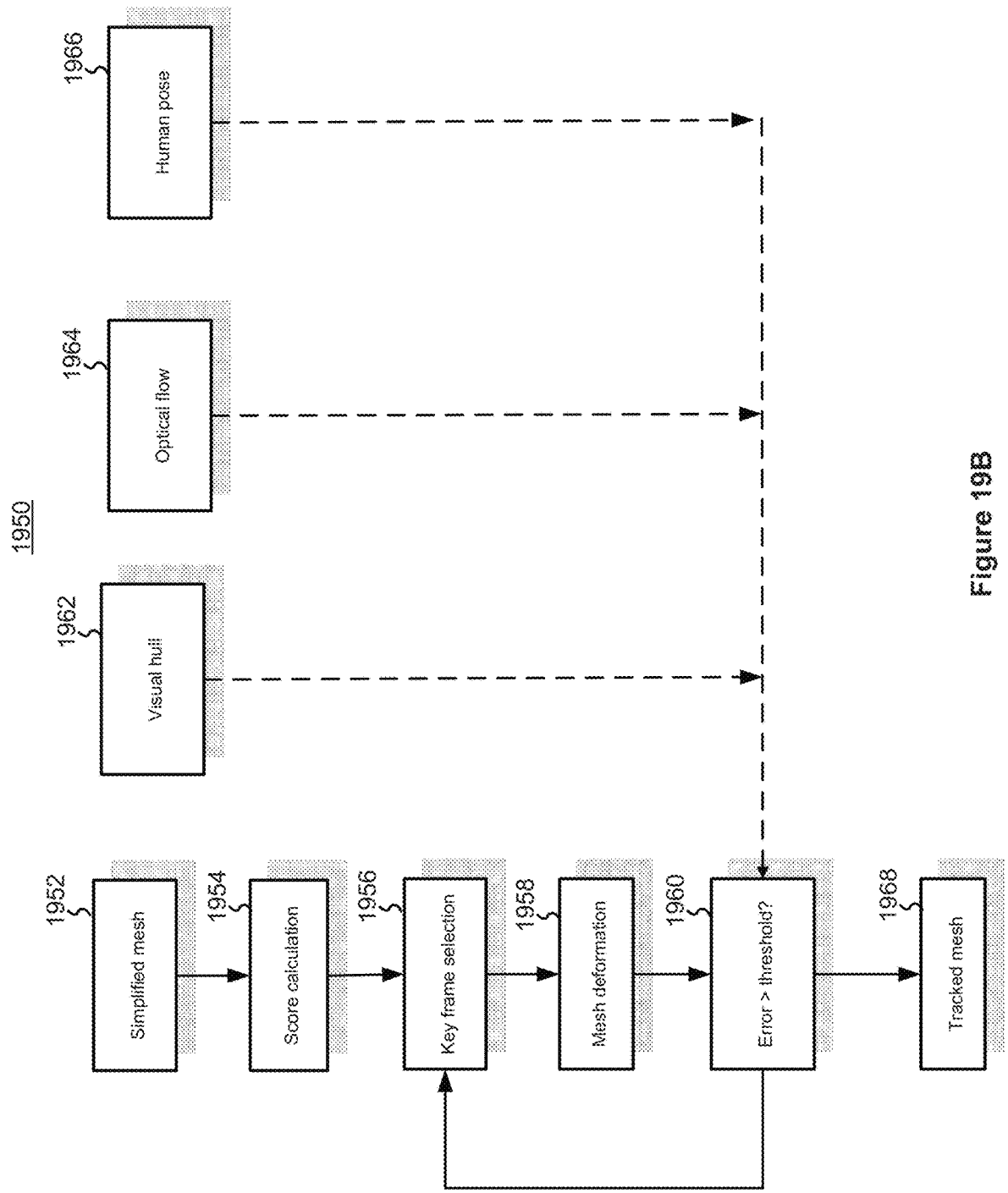
FIG. 19B is a flowchart illustrating a mesh-mesh tracking process in accordance with some implementations.

FIGS. 19A-19B illustrates two example tracking processes 1900 and 1950. The first kind of tracking, referred to as depth-depth tracking, takes the depth maps as inputs and calculates a motion field that deforms the reference frame to the current data frame. While the other kind of tracking, called mesh-mesh tracking, deforms the key frame simplified mesh to the nearby frames to maintain the same connectivity. The detailed pipeline of these two kinds of tracking are described as followings.

FIG. 19A illustrates an example depth-depth tracking process 1900. The depth-depth tracking process 1900 uses the pose term in the energy function when solving the non-rigid motion field estimation problem. More specifically, the energy function is defined as follows:

$$E(G) = \lambda_{data} E_{data}(G) + \lambda_{rigid} E_{rigid}(G) + \lambda_{smooth} E_{smooth}(G) + \lambda_{null} E_{null}(G) + \lambda_{corr} E_{corr}(G) + \lambda_{pose} E_{pose}(G)$$

where data term, rigid term, smooth term, hull term and correspondence term have been adopted in previous works. The hull term and correspondence term may be optional.

Estimating the non-rigid motion field may be technically challenging, as the iterative optimization problem may end up in erroneous local optima. The introduction of the correspondence term may significantly improve the robustness of the solver.

Calculation of optical flow may be a large burden. The process 1900 uses the pose term to improve the performance of tracking with lower computational complexity. From the RGB images of each frame, the human pose estimation module outputs the estimated 3D joint position, denoted as qnf 1 : : : ; f : : : ; F, where n and f denote the frame index and joint index, and F is the number of considered joints. In consideration that the deformed positions of the reference frame joints should match with the corresponding data frame joints. The pose term is defined as follows:

$$E_{pose}(G) = \sum_{f=1}^{F} \|\mathcal{F}(q_{rf}; G) - q_{nf}\|^2$$

where r and n denote the index of the reference frame and data frame, respectively, $$G = \{R, T\} \cup \{A_k, t_k\}_{k=1}^{N}$$

is the non-rigid motion field parameters to be estimated, if(v; G) is the deformed position of point v. However, the inaccuracy of 3D joint positions may cause misalignment. To solve this problem, the pose weight Apose may be dynamically relaxed. The initial value of Apose may be set relatively large, which helps deformed volume mesh rapidly converge to a roughly aligned position. Then, Apose is relaxed to avoid the negative impact of inaccuracy and further alignment is achieved using the data term. More specifically, the energy value $[E(G)]_i$ in the i-th iteration is recorded. If the relative total energy does not change significantly between i and i+1, i.e., $$\frac{|[E(G)]_{i+1} - [E(G)]_i|}{[E(G)]_i} < \sigma$$

the pose term $\lambda_{pose}$ is relaxed, for example, $$\lambda_{pose} \leftarrow \frac{1}{2}\lambda_{pose}.$$

A threshold value σ may be set at 0.005.

FIG. 19B illustrates an example mesh-mesh tracking process 1950. Note that mesh deformation is achieved by solving non-rigid motion field estimation as demonstrated before. The mesh-mesh tracking process 1950 may also use the human pose information in the same way as depth-depth tracking.

Figure 20:
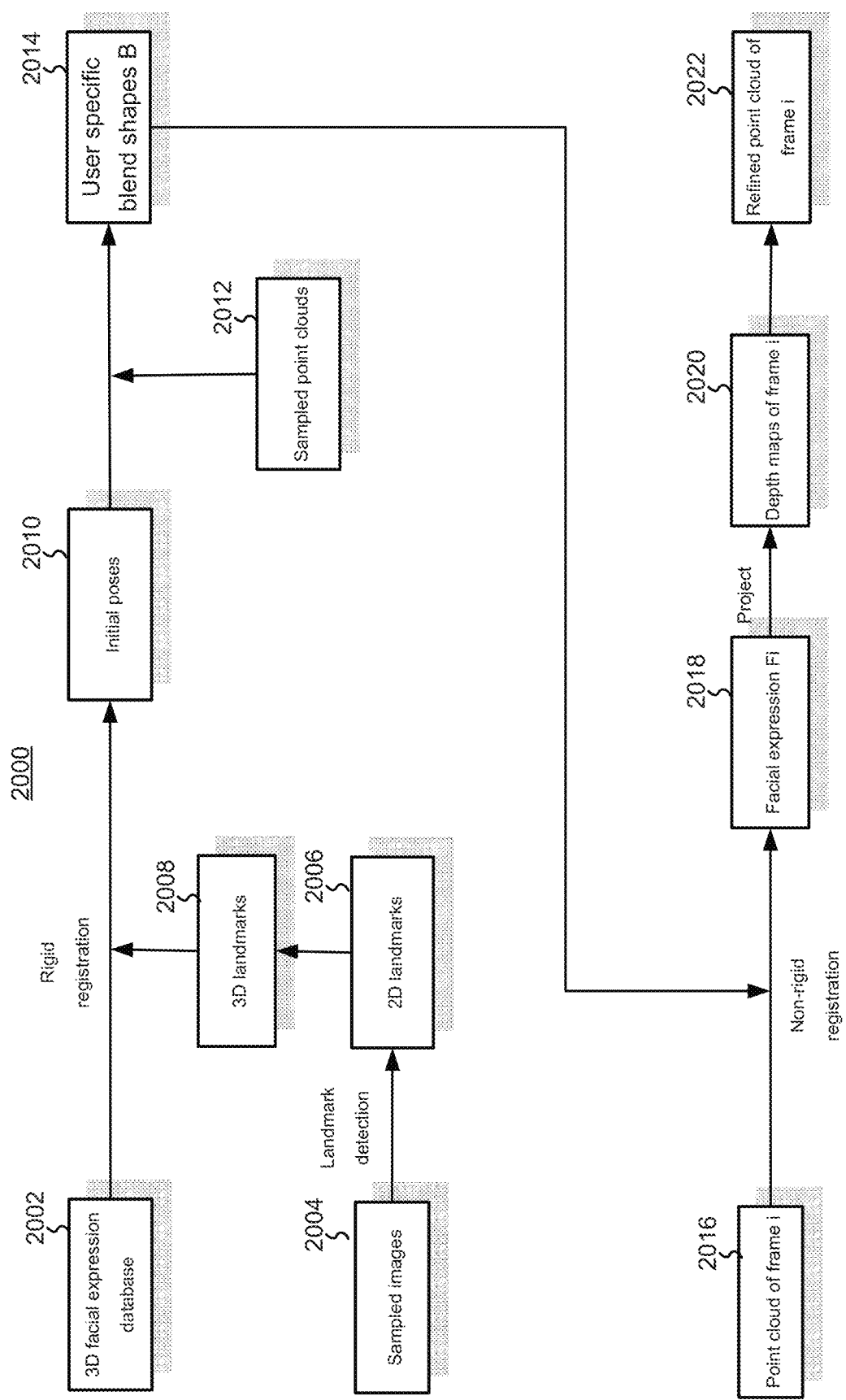
FIG. 20 is a flowchart illustrating a face improvement process in accordance with some implementations.
Figure 21:
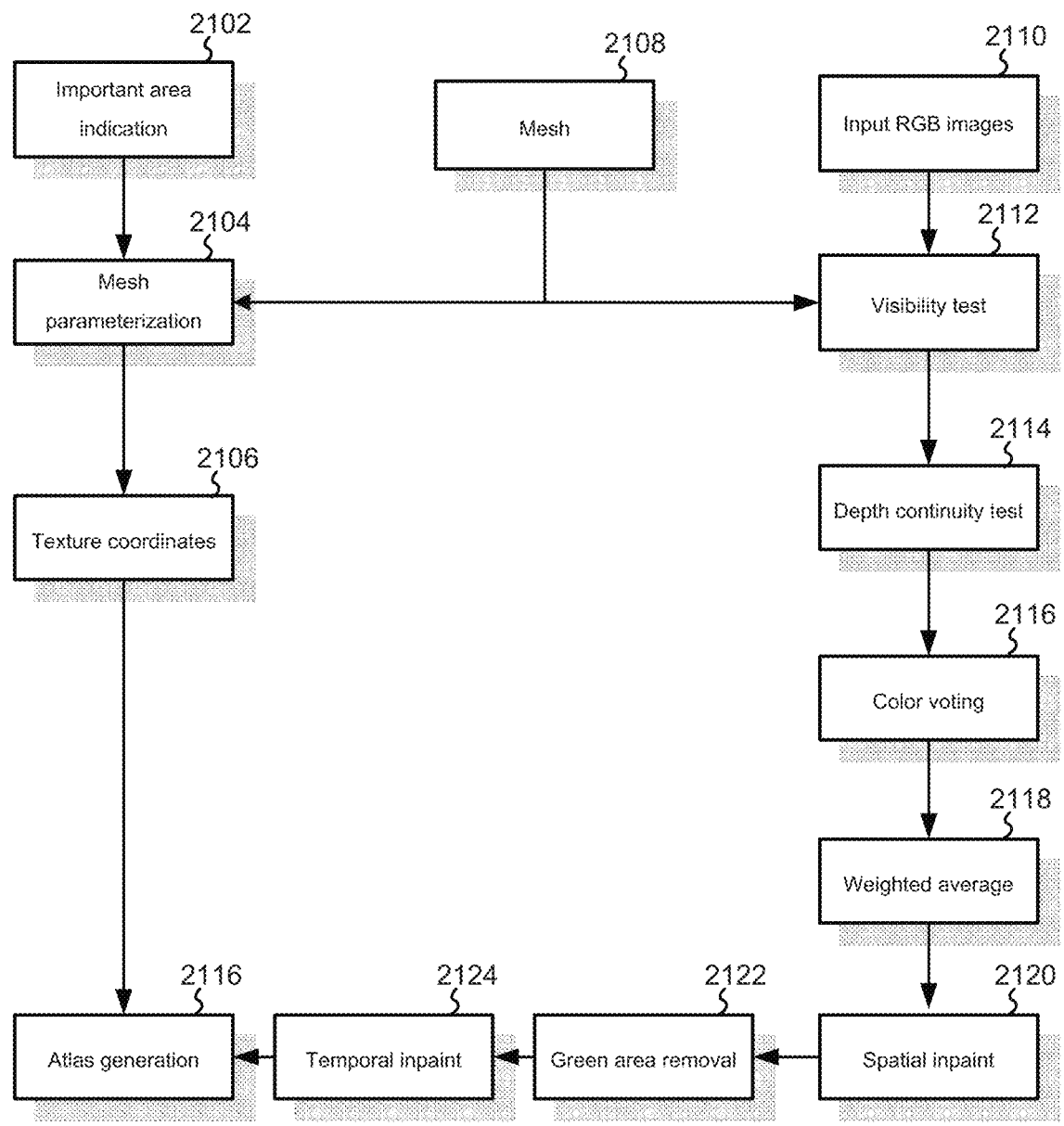
FIG. 21 is a flowchart illustrating a rendering process in accordance with some implementations.

FIG. 20 illustrates an example face improvement process 2000. The process 2000 takes coarse point clouds as input and refines point clouds of one or more face regions.

Human facial performance is mainly affected by identity (different shapes) and expression. The former factor is constant for a certain user while the latter may change over time. Based on these observations, a number of frames are first sampled from the captured sequence and used to construct a set of user specific blendshapes. Then, they are applied to track facial expressions of the user across the whole sequence. Finally, point clouds of face region are replaced with the registered face models.

A 3D facial expression database DF containing 3D model of sufficient enough individuals (for example 100), with 46 expression blendshapes for each, may be used. Any facial expression of any identity F can be approximated by the weighted sum of these blendshapes, which could be expressed as tensor contraction:

$$F = D_F \times w_{id} \times w_{exp}$$

where Wid and Wexp are vectors of identity weights and expression weights, respectively.

In order to generate user-specific blendshapes from DF, several frames (typically 20-30) are sampled from the captured sequence and landmarks detection algorithm are used to extract 2D facial features. 2D landmarks could be projected back into 3D space with corresponding depth maps. For each sampled frame, the morphable model DF is roughly registered to the point cloud with 3D landmarks correspondences. More accurate registrations may be achieved by minimizing the following energy:

$$E_d = \sum_{k=1}^{m} P(M_i(D_F \times w_{id} \times w_{exp,i})^{v_k}, v_k^*)$$

where Mi is the transformation matrix of sampled frame i and P measures the point-plane distance of the k-th vertex vk on blendshape and its corresponding closest point in the target point cloud. A coordinate-descent method may be applied to solve for Mi, Wid and Wexp, i, by alternately optimizing each parameter while fixing the others and update the closet point correspondences in each iteration. 3 iterations may be sufficient for convergence. In the next step, Ed is summed over all sampled frames and the identity weights wid is refined, which should remain constant, while the transformation matrix Mi and expression weights Wexp.i are fixed. User specific blendshapes B can then be constructed from DF with the obtained wid.

Facial expression Fi for each frame i can then be tracked by minimizing:

$$E_t = \sum_{k=1}^{m} P(M_i(B \times w_{exp,i})^{v_k}, v_k^*) + \omega_t \| w_{exp,i} - w_{exp,i-1} \|$$

where Wt (set to 10 in our implementation) controls the weights of temporal coherence in the tracking. Note that Mi, Wexp.i could be used as initial value for the optimization of frame i+1. Finally, refine the coarse point clouds may need to be refined with the reconstructed facial expressions h. This could be achieved by projecting Fi (as a mesh) into every depth maps of frame i and replace the original depth d with the projected depth d* if: $\|d-d'\| \leq \tau$ $\tau$ is set to 12 mm in our implementation to reject this modification when Fi is not visible.

FIG. 21 illustrates an example texturing process 2100. The important area inferred by the human pose estimation model and mesh data are input to the mesh parameterization module. It will generate the texture coordinates for the mesh file in 2D space. On the other side, it needs to decide the color value for each sample point on the mesh. The key point here is that each sample point on the mesh can be seen by multiple cameras. It needs to decide whether to use the color information from that camera and what the weight of the color value from this camera is if it is chosen to be used. The detailed process of deciding the color value includes: first, a visibility test is conducted so that if the object is occluded in that camera, the color information from the camera will not be used; next, a depth continuity test is conducted.

Figure 22:
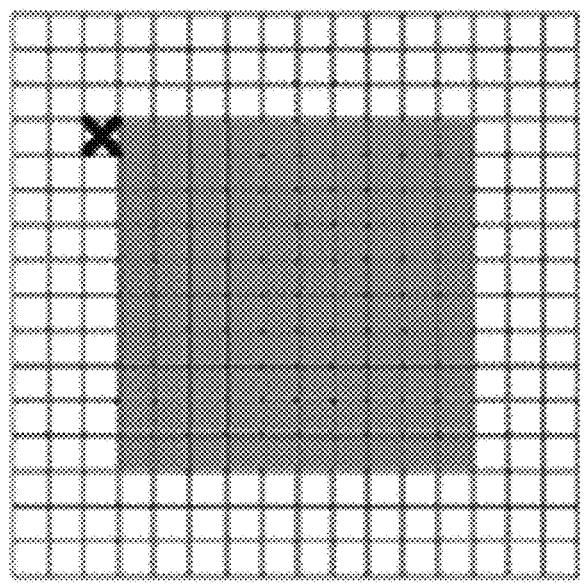
FIG. 22 is a block diagram illustrating a depth continuity test pattern in accordance with some implementations.

An example depth test pattern is illustrated in FIG. 22. Each sample point is checked to determine the maximum depth gradient in a range. The range can be changed, 16×16 is a typical value. FIG. 22 contains 2 parts of the ranges. One is red and the other is white. The cross in the figure represents the place where the depth gradient is the largest. If the cross is in the red area, the sample point is set to be invisible for this camera. However, if the cross is in the white area, it needs to calculate an additional weight for this camera. The weight increases as the distance of the cross to the bounder of the red area increases. The range of this additional weight is [0, 1]. If none of the camera sees the sample point because of the depth test, a color voting is conducted to see if the agreement can be reached. Finally, the weight of the pixel from each camera is determined by calculating the normal direction and the camera's look at direction with normalization. Also, the additional weight from depth continuity test is multiplied before the normalization. Then, after having the weight, a weighted average is calculated to get the color value for each sample point on the mesh.

Then, three more steps of post-processing may be performed, a spatial inpaint, a green area removal, and a temporal inpaint. Spatial inpaint is a process to deal with the sample points that no camera sees. It takes use of the pixel values at the boundary of that area and blend to the fill the samples. The green area removal submodule makes sure H of the color in HSV space does not change, but if it is within the range of green color, the saturation will decrease. The temporal inpaint takes advantage of the tracked mesh data. Because for the tracked mesh, all the connectivities are the same, the texture on the same face can be copies to the next frame if it is unseen. By using this idea a window size (for example, 10 frames) is set and use this window to choose a best color to in paint the sample point where in one of the frames it is unseen. The last step is atlas generation. This submodule takes texture coordinates and the color value on the surface of the mesh and use GPU to render a texture map.

In a tracking process, mesh, texture map and audio bitstreams are encoded in the current MP4 format. First, current MP4 format supports audio, video and audio tracks. Encoded audio bitstream is then e placed in the audio track encoded texture map bitstream is placed in the video track and encoded mesh bitstream is placed in the caption track. By only changing some metadata to let mesh "pretend to be caption", he packaged holographic video bitstream can be easily stored and streamed using the current available MP4 format without any changes.

Figure 23:
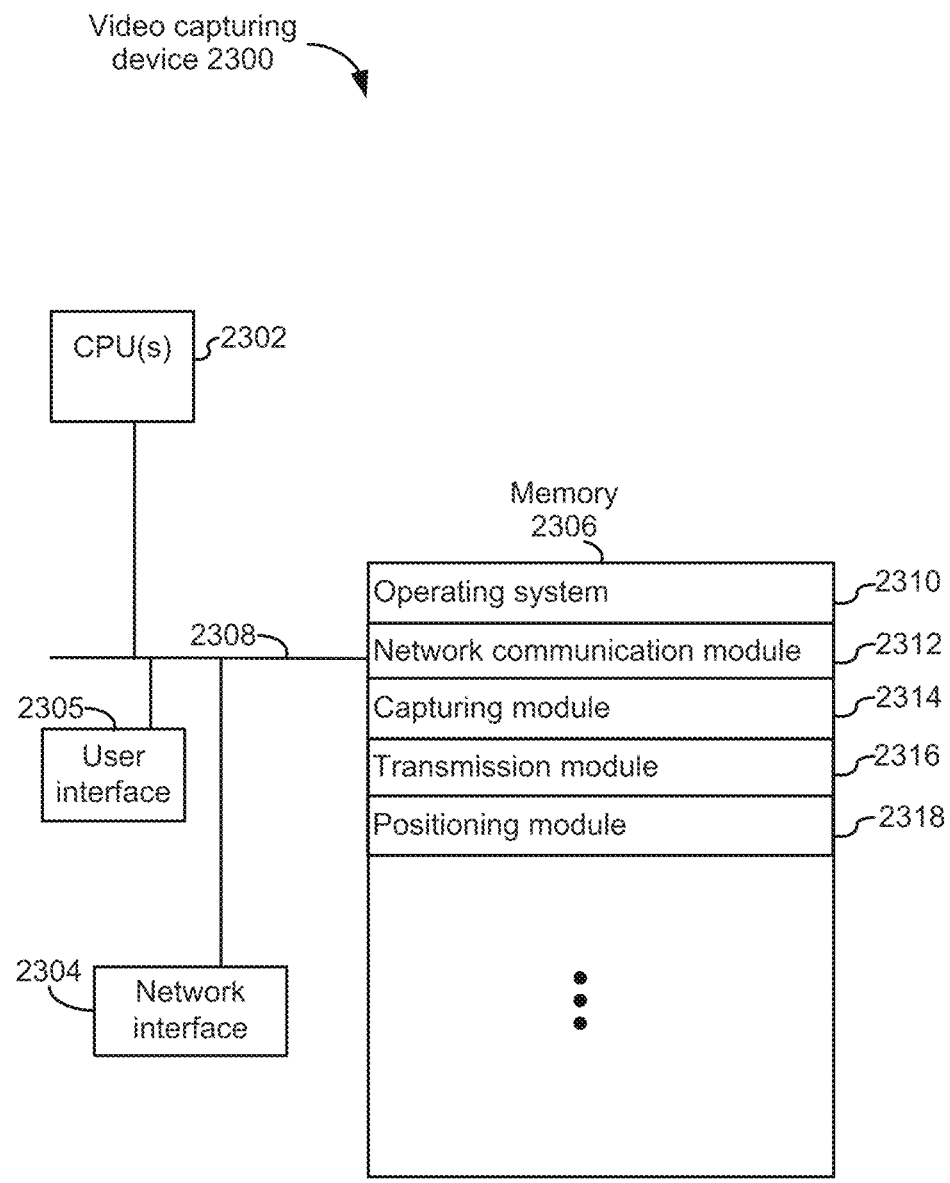
FIG. 23 is a block diagram illustrating a video capturing device in accordance with some implementations.

FIG. 23 is a block diagram illustrating a video capturing device 2300 in accordance with some implementations. The device 2300 in some implementations includes one or more processing units CPU(s) 2302 (also referred to as processors), one or more network interfaces 2304, a user interface 2305, a memory 2306, and one or more communication buses 2308 for interconnecting these components. The communication buses 2308 optionally include circuitry (sometimes called a chipset) that interconnects and controls communications between system components. The memory 2306 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 2306 optionally includes one or more storage devices remotely located from the CPU(s) 2302. The memory 2306, or alternatively the non-volatile memory device(s) within the memory 2306, comprises a non-transitory computer readable storage medium. In some implementations, the memory 2306 or alternatively the non-transitory computer readable storage medium stores the following programs, modules and data structures, or a subset thereof:

an operating system 2310, which includes procedures for handling various basic system services and for performing hardware dependent tasks;

a network communication module (or instructions) 2312 for connecting the device 102 with other devices (e.g., the clustering system 106 and the devices 102B . . . 102D) via one or more network interfaces 204 (wired or wireless), or the communication network 104 (FIG. 1);

a capturing module 2314 for capturing one or more audio and/or video frames;

a transmission module 2316 for transmitting data associated with the captured frames to a server; and a positioning module 2318 for adjusting camera or camera group positions.

In some implementations, the user interface 205 includes an input device (e.g., a keyboard, a mouse, a touchpad, a track pad, and a touch screen) for a user to interact with the device 2300.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 2306 optionally stores a subset of the modules and data structures identified above. Furthermore, the memory 2306 may store additional modules and data structures not described above.

Figure 24:
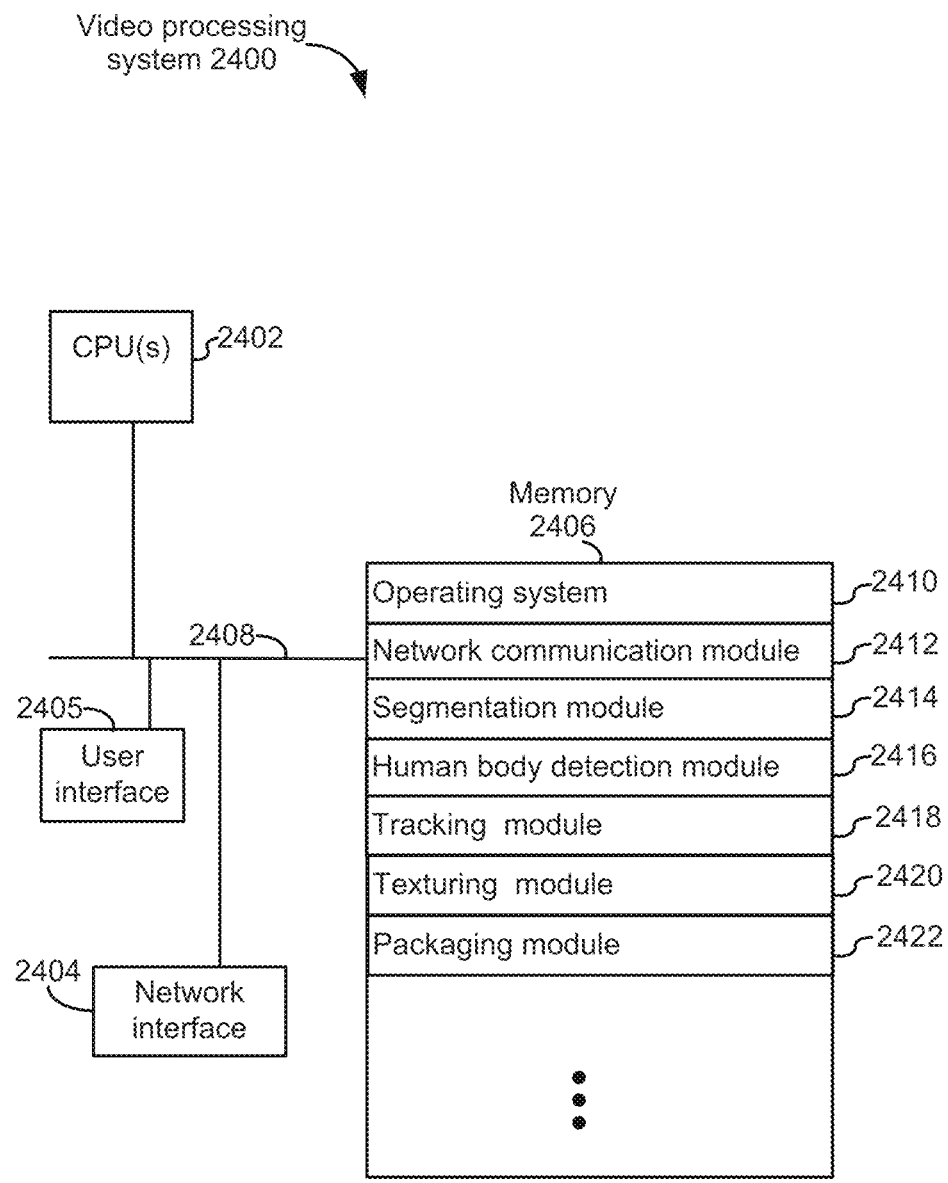
FIG. 24 is a block diagram illustrating a video processing system in accordance with some implementations.

FIG. 24 is a block diagram illustrating a video processing system in accordance with some implementations. The clustering system 106 typically includes one or more processing units CPU(s) 2402 (also referred to as processors), one or more network interfaces 2404, memory 2406, and one or more communication buses 2408 for interconnecting these components. The communication buses 2408 optionally include circuitry (sometimes called a chipset) that interconnects and controls communications between system components. The memory 2406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 2406 optionally includes one or more storage devices remotely located from CPU(s) 2402. The memory 2406, or alternatively the non-volatile memory device(s) within the memory 2406, comprises a non-transitory computer readable storage medium. In some implementations, the memory 2406 or alternatively the non-transitory computer readable storage medium stores the following programs, modules and data structures, or a subset thereof:

an operating system 2410, which includes procedures for handling various basic system services and for performing hardware dependent tasks;

a network communication module (or instructions) 2412 for connecting the server system 106 with other devices (e.g., the cameras 102) via the one or more network interfaces 2404 (wired or wireless), or the communication network 104 (FIG. 1);

a segmentation module 2414 for producing a foreground mask for each video frame in the one or more video frames;

a human body detection module 2416 for detecting two or more body parts of a human pose captured in the one or more video frames in accordance with one or more foreground masks produced in the segmentation process and a human pose recognition technique;

a tracking module 2418 for tracking a human pose or one or more predefined parts of a human body;

a texturing module 2420 for producing a texture map; and a packaging module 2422 for compressing mesh data, a texture map, and audio bit streams into a file having a predefined format.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 2406 optionally stores a subset of the modules and data structures identified above. Furthermore, the memory 2406 may store additional modules and data structures not described above.

Although FIGS. 23 and 24 show a "video capturing device 2302" and a "video processing system 2304," respectively, FIGS. 23 and 24 are intended more as functional description of the various features which may be present in computer systems than as a structural schematic of the implementations described herein. In practice, and as recognized by those of ordinary skill in the art, items shown separately could be combined and some items could be separated.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first camera could be termed a second camera, and, similarly, a second camera could be termed a first camera, without changing the meaning of the description, so long as all occurrences of the "first camera" are renamed consistently and all occurrences of the "second camera" are renamed consistently. The first camera and the second camera are both cameras, but they are not the same camera.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A holographic video recording system, comprising:
   a first group of cameras positioned at a first position, wherein the first group of cameras includes a first infrared camera and a first color camera;
   a second group of cameras positioned at a second position, wherein the second group of cameras includes a second infrared camera and a second color camera; and
   a third group of camera spatially positioned between the first infrared camera and the second infrared camera in a linear fashion, wherein the third group of camera includes a third infrared camera;
   wherein a first distance spaced between the first infrared camera and the second infrared camera is greater than a second distance spaced between the first infrared camera and the third infrared camera; and
   wherein a first depth map is calculated using the first infrared camera and the second infrared camera spaced at the first distance;
   wherein a second depth map is calculated using the first infrared camera and the third infrared camera spaced at the second distance; and
   wherein a combined depth map is obtained through fusing by using depth values from the first depth map for a first object beyond a predefined distance from the holographic video recording system, and/or using depth values from the second depth map for a second object within the predefined distance from the holographic video recording system.

2. The holographic video recording system of claim 1, further comprising a predetermined number of groups of cameras, each group of cameras in the predetermined number of groups of cameras includes at least a color camera and an infrared camera.

3. The holographic video recording system of claim 1, wherein distance between the first position and the second position is fixed.

4. The holographic video recording system of claim 1, wherein distance between the first position and the second position is adjustable.

5. The holographic video recording system of claim 4, wherein the distance between the first position and the second position is automatically adjusted in accordance with a position of a mobile object using a motor to move at least one group of the cameras, and the distance between two adjacent cameras in a same group is fixed.

6. The holographic video recording system of claim 1, further comprising: an infrared pattern projector configured to project light to an object.

7. The holographic video recording system of claim 6, wherein the infrared pattern projector is further configured to adjust light projection to the object in accordance with feedback from any camera included in the holographic video recording system by panning, tilting, and zooming, when the camera recognizes a person or a predefined object, or a movement thereof, to focus on the person or the predefined object.

8. A depth sensing method, applicable to a holographic video recording system, comprising:
   providing the holographic video recording system comprising:
      a first group of cameras positioned at a first position, wherein the first group of cameras includes a first infrared camera and a first color camera;
      a second group of cameras positioned at a second position, wherein the second group of cameras includes a second infrared camera and a second color camera; and
      a third group of camera spatially positioned between the first infrared camera and the second infrared camera in a linear fashion, wherein the third group of camera includes a third infrared camera;
   wherein a first distance spaced between the first infrared camera and the second infrared camera is greater than a second distance spaced between the first infrared camera and the third infrared camera;
calculating a first depth map using the first infrared camera and the second infrared camera spaced at the first distance;
calculating a second depth map using the first infrared camera and the third infrared camera spaced at the second distance; and
obtaining a combined depth map through fusing by using depth values from the first depth map for a first object beyond a predefined distance from the holographic video recording system, and/or using depth values from the second depth map for a second object within the predefined distance from the holographic video recording system.

9. The depth sensing method of claim 8, wherein distance between the first position and the second position is fixed.

10. The depth sensing method of claim 8, wherein distance between the first position and the second position is adjustable.

11. The depth sensing method of claim 10, further comprising automatically adjusting the distance between the first position and the second position in accordance with a position of a mobile object using a motor to move at least one group of the cameras, wherein the distance between adjacent cameras in a same group is fixed.

12. The depth sensing method of claim 8, further comprising: projecting light to the objects by an infrared pattern projector.

13. The depth sensing method of claim 12, further comprising: adjusting light projection to the objects in accordance with feedback from any camera included in the holographic video recording system by panning, tilting, and zooming, when the camera recognizes a person or a predefined object, or a movement thereof, to focus on the person or the predefined object.

14. A non-transitory computer readable storage medium, applicable to a holographic video recording system comprising:
a first group of cameras positioned at a first position, wherein the first group of cameras includes a first infrared camera and a first color camera;
a second group of cameras positioned at a second position, wherein the second group of cameras includes a second infrared camera and a second color camera; and
a third group of camera spatially positioned between the first infrared camera and the second infrared camera in a linear fashion, wherein the third group of camera includes a third infrared camera;
wherein a first distance spaced between the first infrared camera and the second infrared camera is greater than a second distance spaced between the first infrared camera and the third infrared camera;
wherein the non-transitory computer readable storage medium comprises instructions stored therein, executable by a processor, causing the processor to:
calculate a first depth map using the first infrared camera and the second infrared camera spaced at the first distance;
calculate a second depth map using the first infrared camera and the third infrared camera spaced at the second distance; and
obtain a combined depth map through fusing by using depth values from the first depth map for a first object beyond a predefined distance from the holographic video recording system, and/or using depth values from the second depth map for a second object within the predefined distance from the holographic video recording system.

15. The non-transitory computer readable storage medium of claim 14, wherein distance between the first position and the second position is fixed.

16. The non-transitory computer readable storage medium of claim 14, wherein distance between the first position and the second position is adjustable.

17. The non-transitory computer readable storage medium of claim 16, wherein the distance between the first position and the second position is automatically adjusted in accordance with a position of a mobile object using a motor to move at least one group of the cameras, and the distance between two adjacent cameras in a same group is fixed.

18. The non-transitory computer readable storage medium of claim 14, wherein the holographic video recording system further comprises an infrared pattern projector configured to project light to an object.

19. The non-transitory computer readable storage medium of claim 18, wherein the infrared pattern projector is further configured to adjust light projection to the object in accordance with feedback from any camera included in the holographic video recording system by panning, tilting, and zooming, when the camera recognizes a person or a predefined object, or a movement thereof, to focus on the person or the predefined object.

20. The holographic video recording system of claim 1, further comprising a camera calibration rig for calibrating intrinsic parameters of the cameras, the camera calibration rig comprising a plurality of vertical levels and a plurality of faces for each level in the plurality of vertical levels, wherein each face in the plurality of faces includes a chess board pattern, and each white area in the chess board pattern includes a different quick response (QR) code.

* * * * *